US011507788B2

United States Patent
Kubota et al.

(10) Patent No.: US 11,507,788 B2
(45) Date of Patent: Nov. 22, 2022

(54) NON-TRANSITORY COMPUTER-READABLE STORAGE MEDIUM FOR STORING ANALYSIS PROGRAM, ANALYSIS APPARATUS, AND ANALYSIS METHOD

(71) Applicant: FUJITSU LIMITED, Kawasaki (JP)

(72) Inventors: Tomonori Kubota, Kawasaki (JP); Yasuyuki Murata, Shizuoka (JP); Yukihiko Hirayanagi, Fuji (JP)

(73) Assignee: FUJITSU LIMITED, Kawasaki (JP)

( * ) Notice: Subject to any disclaimer, the term of this patent is extended or adjusted under 35 U.S.C. 154(b) by 294 days.

(21) Appl. No.: 16/856,082

(22) Filed: Apr. 23, 2020

(65) Prior Publication Data

US 2020/0380318 A1 Dec. 3, 2020

(30) Foreign Application Priority Data

May 31, 2019 (JP) .............................. JP2019-103236

(51) Int. Cl.
*G06K 9/62* (2022.01)
*G06V 10/25* (2022.01)
*G06V 10/40* (2022.01)

(52) U.S. Cl.
CPC ........... *G06K 9/6285* (2013.01); *G06V 10/25* (2022.01); *G06V 10/40* (2022.01)

(58) Field of Classification Search
CPC ........ G16H 30/20; G16H 50/20; A61B 5/445; G06T 5/006; G06V 20/58; H04N 5/272; H04N 5/2628
See application file for complete search history.

(56) References Cited

U.S. PATENT DOCUMENTS

| 6,754,369 B1 * | 6/2004 | Sazawa | G06V 20/635 |
| | | | 382/105 |
| 7,550,707 B2 * | 6/2009 | Hashimoto | G06V 10/10 |
| | | | 250/221 |
| 7,965,904 B2 * | 6/2011 | Kobayashi | G06T 7/74 |
| | | | 382/292 |

(Continued)

FOREIGN PATENT DOCUMENTS

| JP | 2018-045350 A | 3/2018 |
| JP | 2018-097807 A | 6/2018 |

OTHER PUBLICATIONS

Ramprasaath R. Selvaraju et al.,"Grad-CAM: Visual Explanations from Deep Networks via Gradient-based Localization", The IEEE International Conference on Computer Vision (ICCV), pp. 618-626, 2017 (Total: 9 pages).

(Continued)

*Primary Examiner* — Yosef Kassa
(74) *Attorney, Agent, or Firm* — Fujitsu Patent Center

(57) ABSTRACT

An analysis method implemented by a computer includes: generating a refine image by changing an incorrect inference image such that a correct label score of inference is maximized, the incorrect inference image being an input image when an incorrect label is inferred in an image recognition process; and narrowing, based on a score of a label, a predetermined region to specify an image section that causes incorrect inference, the score of the label being inferred by inputting to an inferring process an image obtained by replacing the predetermined region in the incorrect inference image with the refine image.

13 Claims, 32 Drawing Sheets

(56) References Cited

U.S. PATENT DOCUMENTS

| | | | | |
|---|---|---|---|---|
| 8,111,927 | B2* | 2/2012 | Vincent | G06V 10/98 |
| | | | | 382/225 |
| 8,369,574 | B2* | 2/2013 | Hu | G06V 40/20 |
| | | | | 382/103 |
| 8,494,273 | B2* | 7/2013 | Chevion | G06K 9/6255 |
| | | | | 382/168 |
| 8,792,039 | B2* | 7/2014 | Hirooka | B60R 1/00 |
| | | | | 348/333.03 |
| 9,298,883 | B2* | 3/2016 | Kurtz | A61B 3/10 |
| 9,308,862 | B2* | 4/2016 | Fujita | G06T 5/006 |
| 9,779,452 | B1* | 10/2017 | Medina | G06Q 40/02 |
| 9,836,839 | B2* | 12/2017 | Champlin | G06V 20/698 |
| 2018/0285698 | A1 | 10/2018 | Yamada | |

OTHER PUBLICATIONS

Chattopadhyay, Aditya et al.,"Grad-CAM++: Improved Visual Explanations for Deep Convolutional Networks", Nov. 9, 2018, XP055737561, 17 pages, Retrieved from the Internet: URL: https://arxiv.org/pdf/1710.11063.pdf [retrieved on Oct. 7, 2020].

Zeiler, Matthew D. et al.,"Visualizing and Understanding Convolutional Networks", Nov. 28, 2013, XP055737669, 11 pages, Retrieved from the Internet: URL: https://arxiv.org/pdf/1311.2901.pdf [retrieved on Oct. 7, 2020].

Extended European Search Report dated Oct. 15, 2020 for corresponding European Application No. 20170363.4, 12 pages.

Ye, Andre, "Neural Network Interpretability Fundamentals", Towards Data Science, Jul. 15, 2020, pp. 1-9, XP055946651, Retrieved from the Internet: URL:https://towardsdatascience.corm/every-ml-engineer-needs-to-know-neural-network-interpretability-afea2ac0824e [retrieved on Jul. 27, 2022].

European Office Action dated Aug. 1, 2022 for corresponding European Patent Application No. 20170363.4, 6 pages.

* cited by examiner

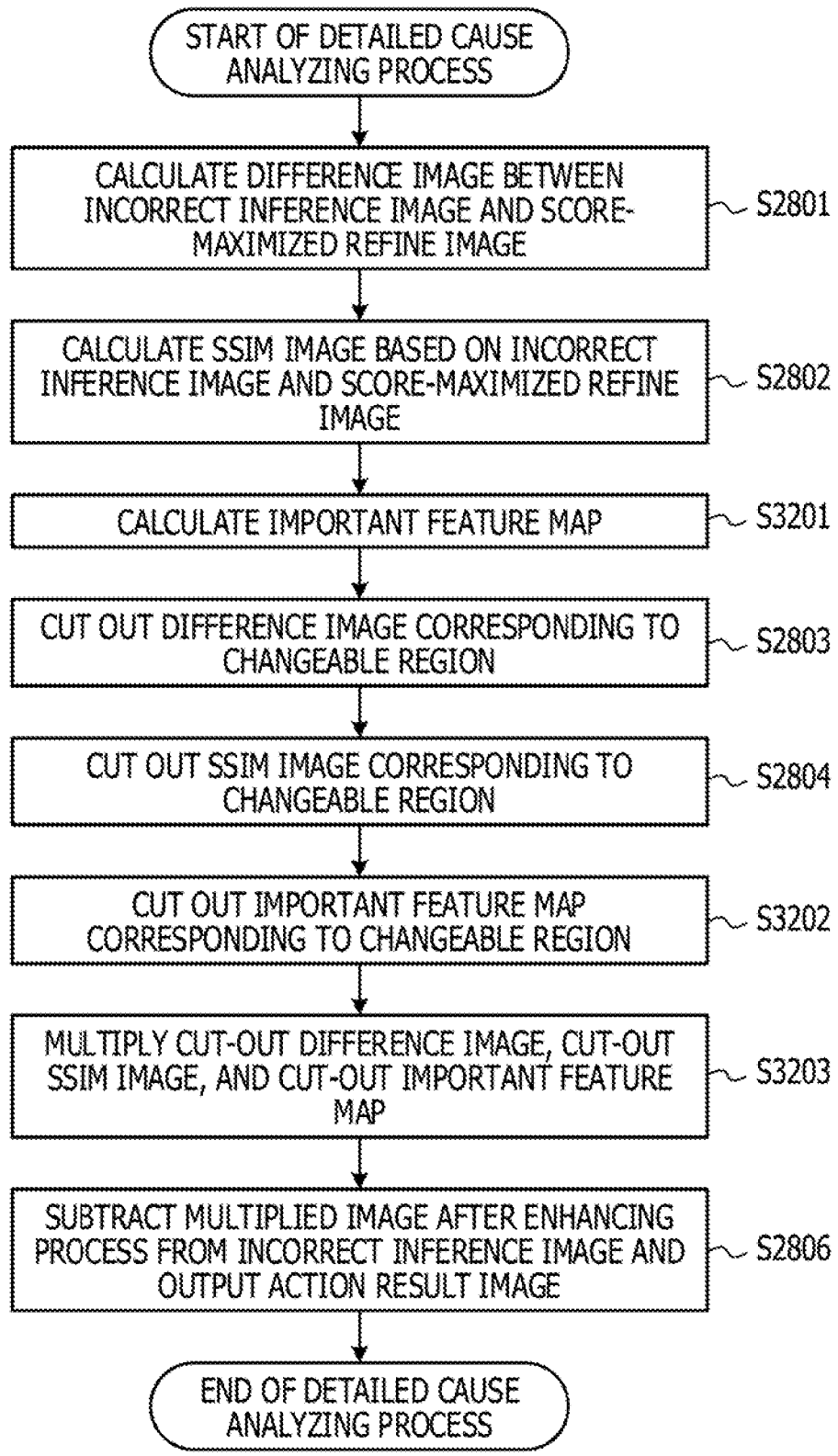

NON-TRANSITORY COMPUTER-READABLE STORAGE MEDIUM FOR STORING ANALYSIS PROGRAM, ANALYSIS APPARATUS, AND ANALYSIS METHOD

CROSS-REFERENCE TO RELATED APPLICATION

This application is based upon and claims the benefit of priority of the prior Japanese Patent Application No. 2019-103236, filed on May 31, 2019, the entire contents of which are incorporated herein by reference.

FIELD

The embodiments discussed herein are related to a non-transitory computer-readable storage medium for storing an analysis program, an analysis apparatus, and an analysis method.

BACKGROUND

Analysis techniques that analyze the cause of incorrect inference when an incorrect label is inferred in an image recognition process using the convolutional neural network (CNN) have been known. Such techniques include the activation maximization method. Analysis techniques that analyze feature portions which have reacted as features in inference in an image recognition process using the CNN have been known. Such techniques include the Grad-CAM method, the guided back propagation (GBP) method.

Among these, the activation maximization method is a method in which changed portions when an input image is changed such that an inference-correct label has the maximum score are identified as image sections that cause incorrect inference. The Grad-CAM method is a method in which attention portions in inference are calculated using information back-propagated from inferred labels and the calculated attention portions are specified as feature portions that have reacted in inference. The GBP method is a method in which feature portions that have reacted in inference are visualized by back-propagation from inferred labels to an input image.

Examples of the related art include Japanese Laid-open Patent Publication Nos. 2018-097807 and 2018-045350.

Examples of the related art also include Ramprasaath R. Selvariju, et al.: Grad-cam: Visual explanations from deep networks via gradient-based localization. The IEEE International Conference on Computer Vision (ICCV), 618-626, 2017.

SUMMARY

According to an aspect of the embodiments, an analysis method implemented by a computer includes: generating a refine image by changing an incorrect inference image such that a correct label score of inference is maximized, the incorrect inference image being an input image when an incorrect label is inferred in an image recognition process; and narrowing, based on a score of a label, a predetermined region to specify an image section that causes incorrect inference, the score of the label being inferred by inputting to an inferring process an image obtained by replacing the predetermined region in the incorrect inference image with the refine image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 32 is a second flowchart illustrating the flow of the detailed cause analyzing process.

DESCRIPTION OF EMBODIMENT(S)

There is however a problem that the above-described analysis techniques are incapable of specifying image sections that cause incorrect inference with a sufficiently high precision.

In an aspect, an object of the present disclosure is to improve precision in specifying image sections that cause incorrect inference.

It is possible to improve the precision at the time of specifying an image section that causes incorrect inference.

Hereinafter, embodiments are described with reference to the accompanying drawings. In the present specification and drawings, components having substantially the same functional configurations are assigned with the same reference signs, and duplicated description is omitted.

First Embodiment

<Functional Configuration of Analysis Apparatus>

Figure 1:
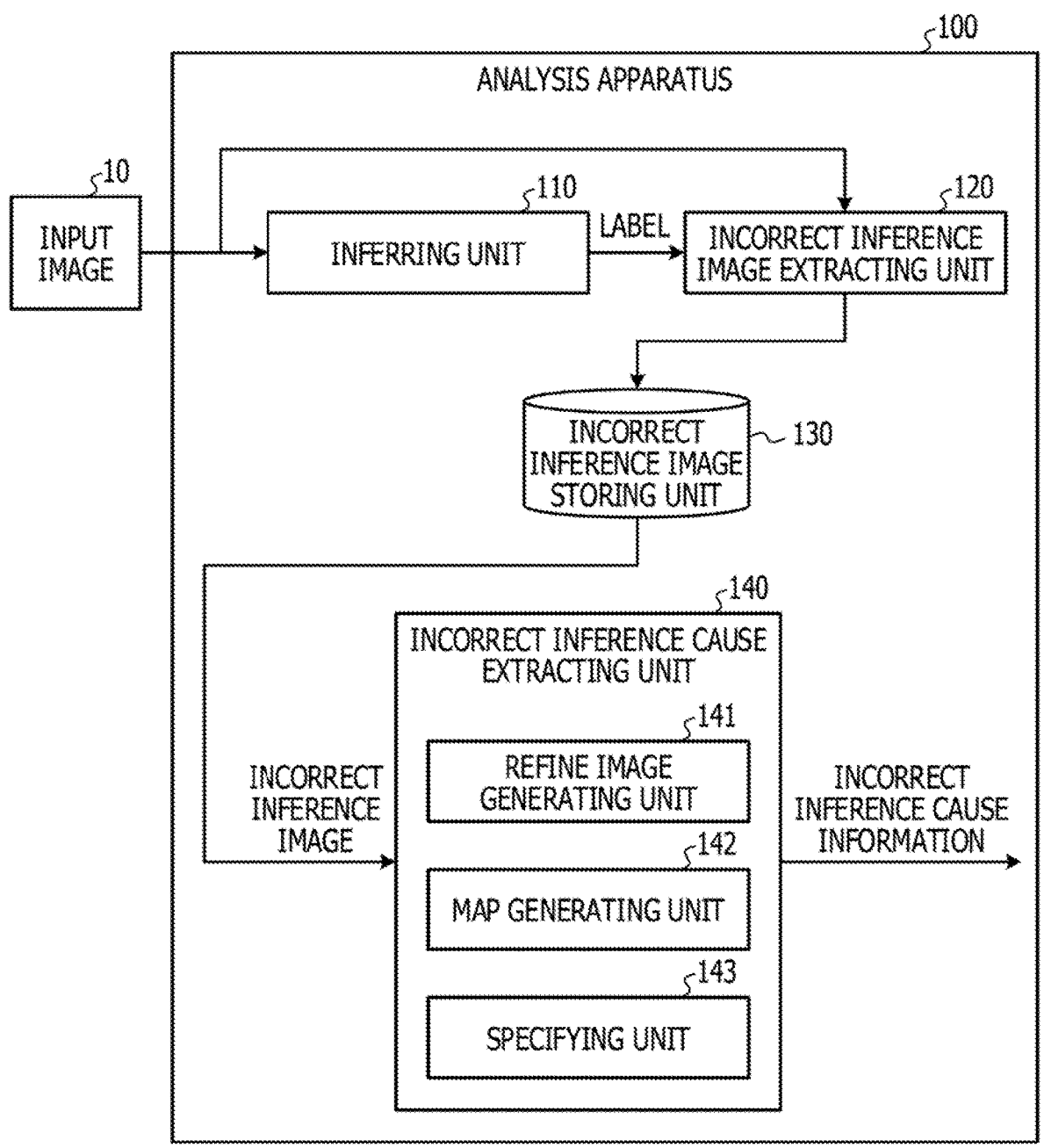
FIG. 1 illustrates an example of a functional configuration of an analysis apparatus.

First, the functional configuration of an analysis apparatus according to a first embodiment is described. FIG. 1 illustrates an example of the functional configuration of the analysis apparatus. In the analysis apparatus 100, analysis programs are installed, and execution of the programs causes the analysis apparatus 100 to function as an inferring unit 110, an incorrect inference image extracting unit 120, and an incorrect inference cause extracting unit 140.

The inferring unit 110 performs an image recognition process using a pre-trained CNN. Specifically, for example, upon input of an input image 10, the inferring unit 110 infers a label indicating the type of an object contained in the input image 10 (the type of a vehicle in the present embodiment) and outputs the inferred label.

The incorrect inference image extracting unit 120 determines whether the label (known) indicating the type of the object contained in the input image 10 and the label inferred by the inferring unit 110 coincide with each other. The incorrect inference image extracting unit 120 extracts, as an "incorrect inference image", an input image that is determined not to coincide (an incorrect label is inferred), and stores the "incorrect inference image" in an incorrect inference image storing unit 130.

The incorrect inference cause extracting unit 140 specifies an image section that causes incorrect inference from an incorrect inference image and outputs incorrect inference cause information. Specifically, for example, the incorrect inference cause extracting unit 140 includes a refine image generating unit 141, a map generating unit 142, and a specifying unit 143.

The refine image generating unit 141 reads the incorrect inference image stored in the incorrect inference image storing unit 130. The refine image generating unit 141 changes the incorrect inference image such that a correct label score when the read incorrect inference image is inputted is maximized to generate a score-maximized refine image.

The map generating unit 142 generates a map for identifying a region that affects inference of a label using an analysis technique or the like that has been used to analyze a cause of an incorrect inference.

The specifying unit 143 replaces the region that affects the inference of a label contained in the generated map in the incorrect inference image with the generated refine image. The specifying unit 143 infers a label with an input of the incorrect inference image in which the region has been replaced with the refine image and determines the effect of the replacement from the score of the inferred label.

The specifying unit 143 infers a label by inputting the incorrect inference image while changing (narrowing) the size of the region that affects the inference of a label and specifies an image section that causes incorrect inference from transition of the score of the inferred label. The specifying unit 143 outputs the specified image section that causes the incorrect inference as the incorrect inference cause information.

In this way, when a region that affects inference of a label is replaced with a refine image, by narrowing the region while referring to the effect of replacement, the image section that causes incorrect inference is specified with a high precision.

<Hardware Configuration of Analysis Apparatus>

Figure 2:
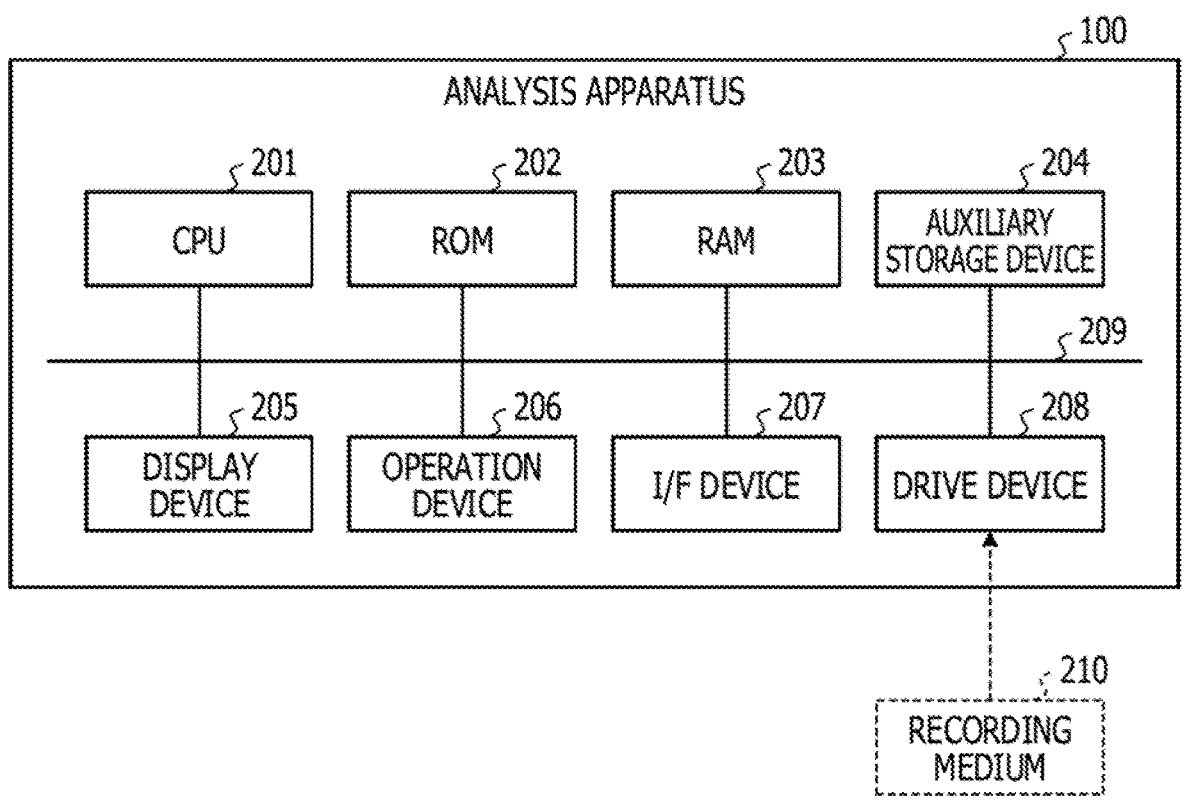
FIG. 2 illustrates an example of a hardware configuration of the analysis apparatus.

Next, a hardware configuration of the analysis apparatus 100 is described. FIG. 2 illustrates an example of the hardware configuration of the analysis apparatus. As illustrated in FIG. 2, the analysis apparatus 100 includes a central processing unit (CPU) 201, a read-only memory (ROM) 202, and a random-access memory (RAM) 203. The CPU 201, the ROM 202, and the RAM 203 form a so-called computer.

The analysis apparatus 100 includes an auxiliary storage device 204, a display device 205, an operation device 206, an interface (IIF) device 207, and a drive device 208. The hardware components of the analysis apparatus 100 are coupled to each other via a bus 209.

The CPU 201 is a calculating device that runs various programs installed in the auxiliary storage device 204 (for example, an analysis program and so on), Although not illustrated in FIG. 2, an accelerator (for example, a graphics processing unit (GPU)) may be combined as a calculating device.

The ROM 202 is a non-volatile memory. The ROM 202 functions as a main storage device which stores various programs, data, and so on to be used by the CPU 201 to run the various programs installed in the auxiliary storage device 204. Specifically, for example, the ROM 202 functions as a main storage device which stores a boot program and so on such as a Basic Input/Output System (BIOS) and an Extensible Firmware Interface (EFI).

The RAM 203 is a volatile memory such as a dynamic random-access memory (DRAM) or a static random-access memory (SRAM), The RAM 203 functions as a main storage device which provides a work region on which the various programs installed in the auxiliary storage device 204 are developed for execution by the CPU 201.

The auxiliary storage device 204 is an auxiliary storage device which stores the various programs and information to be used for execution of the various programs. For example, the incorrect inference image storing unit 130 is implemented by the auxiliary storage device 204.

The display device 205 is a display device that displays various display screens containing the incorrect inference cause information and the like. The operation device 206 is an input device to be used by a user of the analysis apparatus 100 to input various instructions to the analysis apparatus 100.

The I/F device 207 is, for example, a communication device to be coupled with a network not illustrated.

The drive device 208 is a device in which a recording medium 210 is set. The recording media 210 discussed herein include media which record information optically, electrically, and magnetically like a CD-ROM, a flexible disk, a magneto-optical disk, and so forth. The recording media 210 may also include a semiconductor memory and so on, such as a ROM and a flash memory, which record information electrically.

The various programs installed in the auxiliary storage device 204 are installed, for example, in such a way that the distributed recording medium 210 is set in the drive device 208, and the various programs recorded in the recording medium 210 are read by the drive device 208. Alternatively, the various programs installed in the auxiliary storage device 204 may be installed by being downloaded from a network that is not illustrated.

<Functional Configuration of Incorrect inference Cause Extracting Unit>

Figure 3:
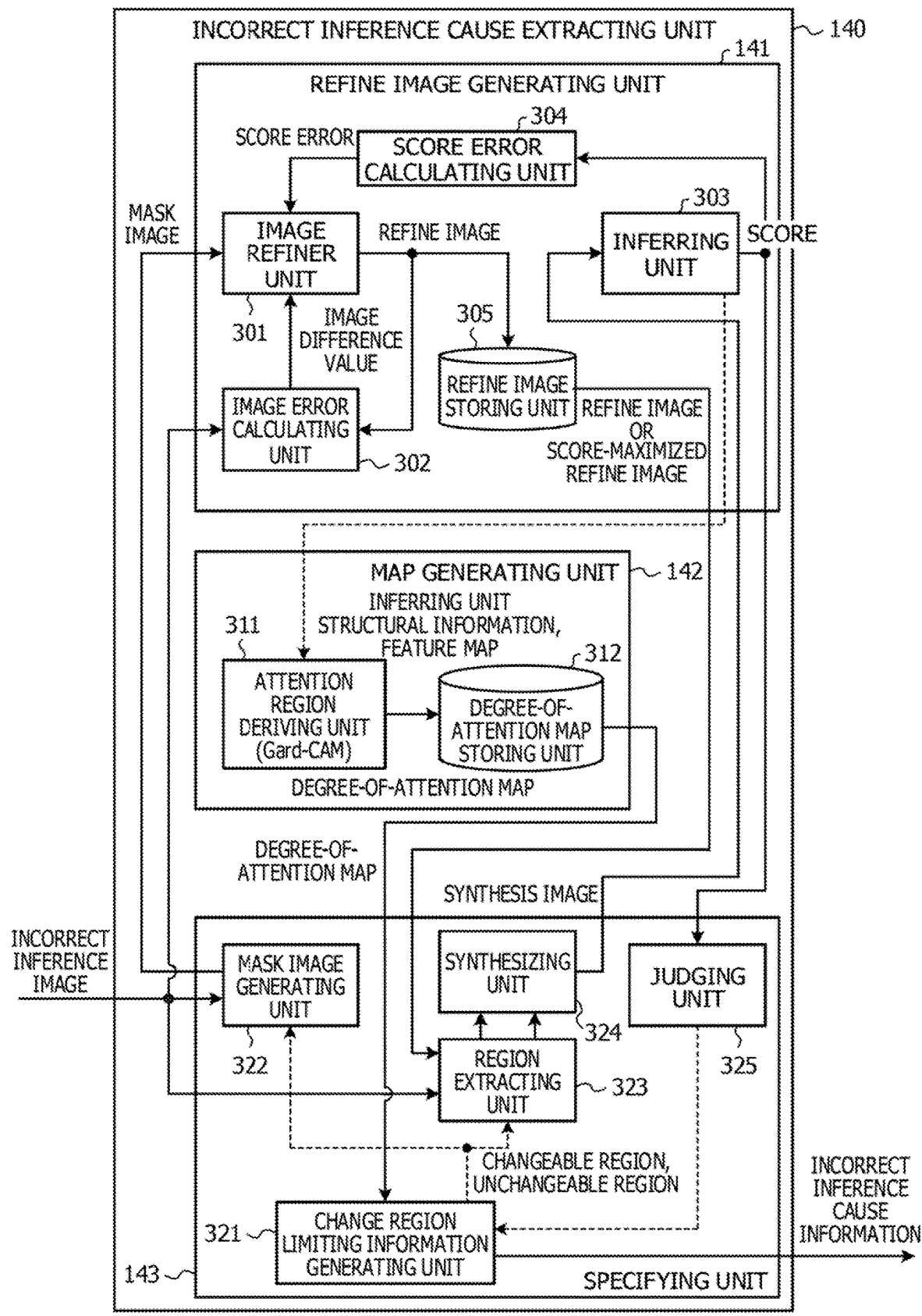
FIG. 3 is a first diagram illustrating an example of a functional configuration of an incorrect inference cause extracting unit.

Next, the functional configuration of the incorrect inference cause extracting unit 140 is described in detail among the functions implemented in the analysis apparatus 100 according to the first embodiment. FIG. 3 is a first diagram illustrating an example of the functional configuration of the incorrect inference cause extracting unit. Hereinafter, the details of the components (the refine image generating unit 141, the map generating unit 142, and the specifying unit 143) of the incorrect inference cause extracting unit 140 are described.

(1) Detail of Refine Image Generating Unit

First, the detail of the refine image generating unit 141 is described. As illustrated in FIG. 3, the refine image generating unit 141 includes an image refiner unit 301, an image error calculating unit 302, the inferring unit 303, and a score error calculating unit 304.

The image refiner unit 301 generates a refine image from a mask image using the CNN as an image generation model, for example. The mask image is an image in which part of the incorrect inference image is masked. The image refiner unit 301 generates a refine image by changing the incorrect inference image in an unmasked region.

The image refiner unit 301 changes the incorrect inference image such that the correct label score is maximized when inference is made using the generated refine image. When generating a refine image using an image generation model, for example, the image refiner unit 301 generates the refine image such that the amount of change from the incorrect inference image (the difference between the refine image and the incorrect inference image) becomes small. In this way, the image refiner unit 301 is capable of obtaining an image (a refine image) visually similar to an image before change (incorrect inference image).

Specifically, for example, when CNN is used as the image generation model, the image refiner unit 301 performs the CNN training in such a manner as to minimize—the difference (score error) between the score when inference is made using a generated refine image and the score maximized from the correct label score, and to minimize—an image difference value that is a difference between the generated refine image and the incorrect inference image.

The image error calculating unit 302 calculates the difference between the incorrect inference image and the refine image outputted from the image refiner unit 301 during the trailing and inputs the image difference value to the image refiner unit 301. The image error calculating unit 302 calculates the image difference value from the difference for each pixel (L1 difference) or by performing structural similarity (SSIM) calculation, for example.

The inferring unit 303 has pre-trained CNN that makes inference with a synthesis image as an input and outputs a score of the inferred label. The synthesis image is an image obtained by synthesizing a refine image obtained by changing an incorrect inference image in an unmasked region and an incorrect inference image in a masked region. In other words, for example, the synthesis image is nothing other than an incorrect inference image in which an unmasked region is replaced with a refine image.

The score outputted by the inferring unit 303 is given to the score error calculating unit 304.

The score error calculating unit 304 calculates the error between the score given by the inferring unit 303 and the score maximized from the correct label score and gives the score error to the image refiner unit 301. The score error given by the score error calculating unit 304 is used in the image refiner unit 301 for the CNN training.

The refine image outputted from the image refiner unit 301 during the training of the CNN included in the image refiner unit 301 is stored in a refine image storing unit 305. The training of the CNN included in the image refiner unit 301 is performed, •for a predetermined number of training iterations (for example, the maximum number of training iterations=N times), or •until the correct label score exceeds a predetermined threshold, or •until the correct label score exceeds a predetermined threshold and the image difference value falls below a predetermined threshold. The refine image when the correct label score outputted from the inferring unit 303 is maximized is hereinafter referred to as a "score-maximized refine image".

(2) Detail of Map Generating Unit

Next, the detail of the map generating unit 142 is described. As illustrated in FIG. 3, the map generating unit 142 includes an attention region deriving unit 311.

The attention region deriving unit 311 acquires, from the inferring unit 303, a feature map and inferring unit structural information (the structure of the network of the CNN, model parameters, and the like) when the inferring unit 303 infers a label using a synthesis image containing a score-maximized refine image.

The attention region deriving unit 311 calculates the degree of attention on each image portion on the incorrect inference image based on the inferring unit structural information and the feature map using the Grad-CAM method to generate a degree-of-attention map.

Specifically, for example, the attention region deriving unit 311 generates the degree-of-attention map in accordance with the following procedure based on the inferring unit structural information and the feature map, —Backpropagate from a label inferred by the inferring unit 303 on the assumption that only the label has an error, obtain an average value for each channel for gradient information obtained in the last layer of convolution, and determine the degree of importance of each channel. —Multiply the feature map of each channel by the degree of importance as a weight, and apply an activation function (ReLU) to a result of adding up values of all the channels at the same coordinates to generate an image with only positive values. —Visualize attention portions with large pixel values (with large gradients) in the generated image utilizing a heat map to generate a degree-of-attention map.

The attention region deriving unit 311 stores the generated degree-of-attention map in a degree-of-attention map storing unit 312.

(3) Detail of Specifying Unit

Next, the detail of the specifying unit 143 is described. As illustrated in FIG. 3, the specifying unit 143 includes a change region limiting information generating unit 321, a mask image generating unit 322, a region extracting unit 323, a synthesizing unit 324, and a judging unit 325.

The change region limiting information generating unit 321 reads the degree-of-attention map from the degree-of-attention map storing unit 312. The change region limiting information generating unit 321 defines a region having a degree of attention of a predetermined level or more (a region that affects inference of a label) as a changeable region and defines a region having a degree of attention of less than the predetermined level as an unchangeable region in the read degree-of-attention map. The change region limiting information generating unit 321 notifies the mask image generating unit 322 and the region extracting unit 323 of the defined changeable region and unchangeable region.

The change region limiting information generating unit 321 gradually increases the level used to define a changeable region and an unchangeable region to narrow the changeable region and widen the unchangeable region (to narrow down the changeable region). In this way, every time updating the sizes of the changeable region and the unchangeable region, the change region limiting information generating unit 321 notifies the mask image generating unit 322 and the region extracting unit 323 of the changeable region and the unchangeable region after the update. When a predetermined instruction is given from the judging unit 325 in response to the notification of the changeable region and the unchangeable region after the update, the change region limiting information generating unit 321 specifies the changeable region immediately before the update as an image section that causes incorrect inference. The change region limiting information generating unit 321 outputs the specified image section as incorrect inference cause information.

The mask image generating unit 322 processes the incorrect inference image based on the changeable region and unchangeable region thus given. Specifically, for example, the mask image generating unit 322 generates a mask image in which an image portion corresponding to the unchangeable region is masked and an image portion corresponding to the changeable region is not masked in the incorrect inference image. The mask image generating unit 322 inputs the generated mask image to the image refiner unit 301.

The region extracting unit 323 processes the refine image (or the score-maximized refine image) and the incorrect inference image based on the changeable region and unchangeable region thus given. Specifically, for example, the region extracting unit 323 extracts an image portion corresponding to the unchangeable region in the incorrect inference image and outputs the extracted image portion to the synthesizing unit 324. The region extracting unit 323 extracts an image portion corresponding to the changeable region from the refine image (or the score-maximized refine image) and outputs the extracted image portion to the synthesizing unit 324.

The synthesizing unit 324 synthesizes the image portion corresponding to the unchangeable region in the incorrect inference image and the image portion corresponding to the changeable region in the refine image (or the score-maximized refine image), which are outputted from the region extracting unit 323, to generate a synthesis image. The synthesizing unit 324 inputs the generated synthesis image to the inferring unit 303.

The judging unit 325 acquires the correct label score outputted from the inferring unit 303 in response to an input of the synthesis image containing the score-maximized refine image made by the inferring unit 303. The judging unit 325 monitors the transition of the acquired correct label score and gives a predetermined instruction to the change region limiting information generating unit 321 when the correct label score falls below a predetermined score acceptable value.

The judging unit 325 instructs the change region limiting information generating unit 321 to increase the level used to define changeable region and an unchangeable region when determining that the transition of the acquired correct label score maintains the predetermined score acceptable value or more.

Specific Example of Process of Each Unit of Incorrect Inference Cause Extracting Unit Next, a specific example of the process of each unit of tare incorrect inference cause extracting unit 140 is described.

(1) Specific Example of Process of Refine Image Generating Unit

Figure 4:
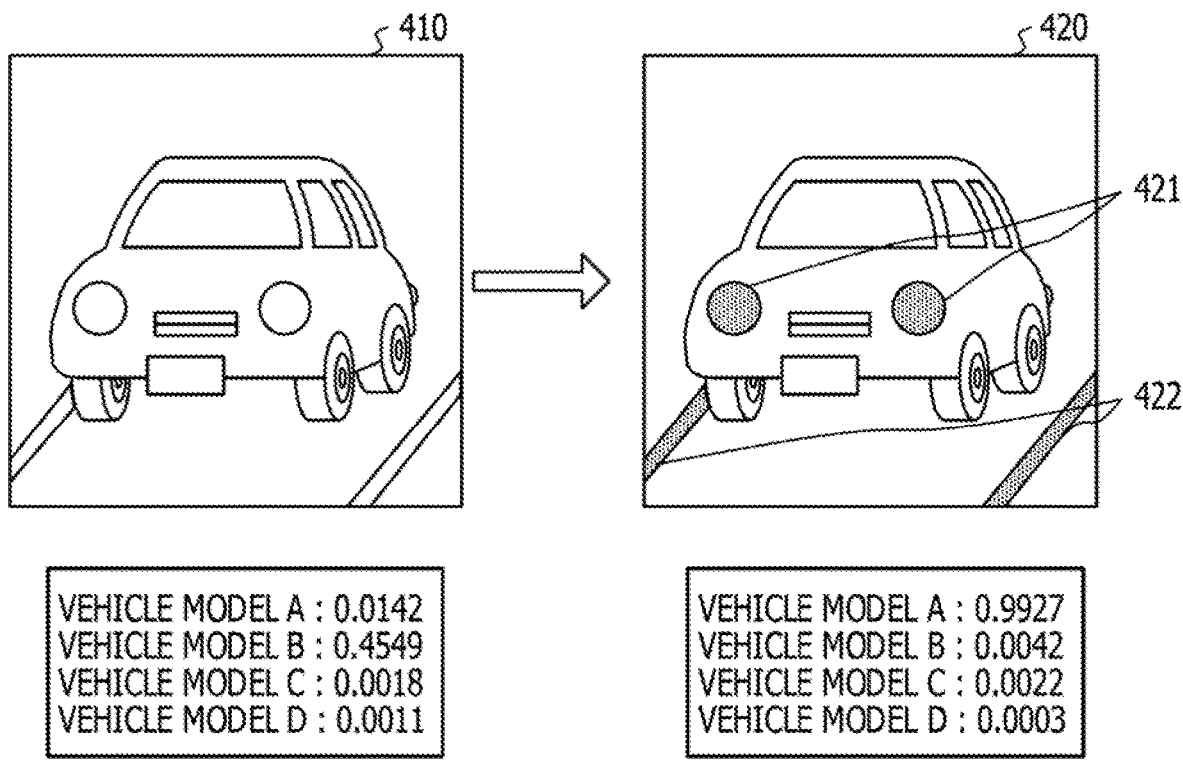
FIG. 4 illustrates a specific example of the process of a refine image generating unit.

First, a specific example of the process of the refine image generating unit 141 is described. FIG. 4 illustrates a specific example of the process of the refine Image generating unit. The example on the left side of FIG. 4 illustrates a case where as a result of making inference with an incorrect inference image 410 containing a vehicle whose correct label="vehicle model A" as an input, the label was incorrectly inferred as "vehicle model B".

The example on the left side of FIG. 4 illustrates that the scores in the case of making inference with the incorrect inference image 410 as the input were such that •the score of vehicle model A=0.0142, •the score of vehicle model B=0.4549, •the score of vehicle model C=0.0018, and •the score of vehicle model D=0.0011.

On the other hand, the example on the right side of FIG. 4 illustrates a case where the refine image generating unit 141 has performed the process of generating a refine image from the incorrect inference image 410 to generate a score-maximized refine image 420. The example on the right side of FIG. 4 illustrates that the refine image generating unit 141 has generated the score-maximized refine image 420 by changing the colors of headlights 421 and a road sign 422 from the incorrect inference image 410.

The example on the right side of FIG. 4 illustrates that in the case of making inference with the score-maximized refine image 420 as an input, the label that coincides with the correct label="vehicle model A" was inferred. The example on the right side of FIG. 4 illustrates the scores in the case of making inference with the score-maximized refine image 420 as the input were such that •the score of vehicle model A=0.9927, •the score of vehicle model B=0.0042, •the score of vehicle model C=0.0022, and •the score of vehicle model D=0.0003.

In this way, according to the refine image generating unit 141, it is possible to generate the score-maximized refine image 420 which allows a label that coincides with the correct label to be inferred and whose correct label score is maximized by changing the incorrect inference image 410.

As illustrated in the example on the right side of FIG. 4, in the case of the score-maximized refine image 420 generated by the refine image generating unit 141, there is a possibility that the road sign, which is irrelevant to the vehicle, is also changed with respect to the incorrect inference image 410. This is because although incorrect backpropagation in the training to maximize a correct label score affects the route (units) for CNN which affects the correct label score, the affected route (units) is not necessarily relevant to the cause of incorrect inference.

In other words, for example, in the case of specifying an image section that causes incorrect inference based on a changed portion like the existing activation maximization method, there is a problem that it is difficult to specify the image section with a sufficient precision (further narrowing is desired for the changed portion).

(2) Specific Example of Processes of Specifying Unit

Next, specific examples of processes of the units (the change region limiting information generating unit 321, the mask image generating unit 322, the region extracting unit 323, the synthesizing unit 324, and the judging unit 325) of the specifying unit 143 are described.

Figure 5:
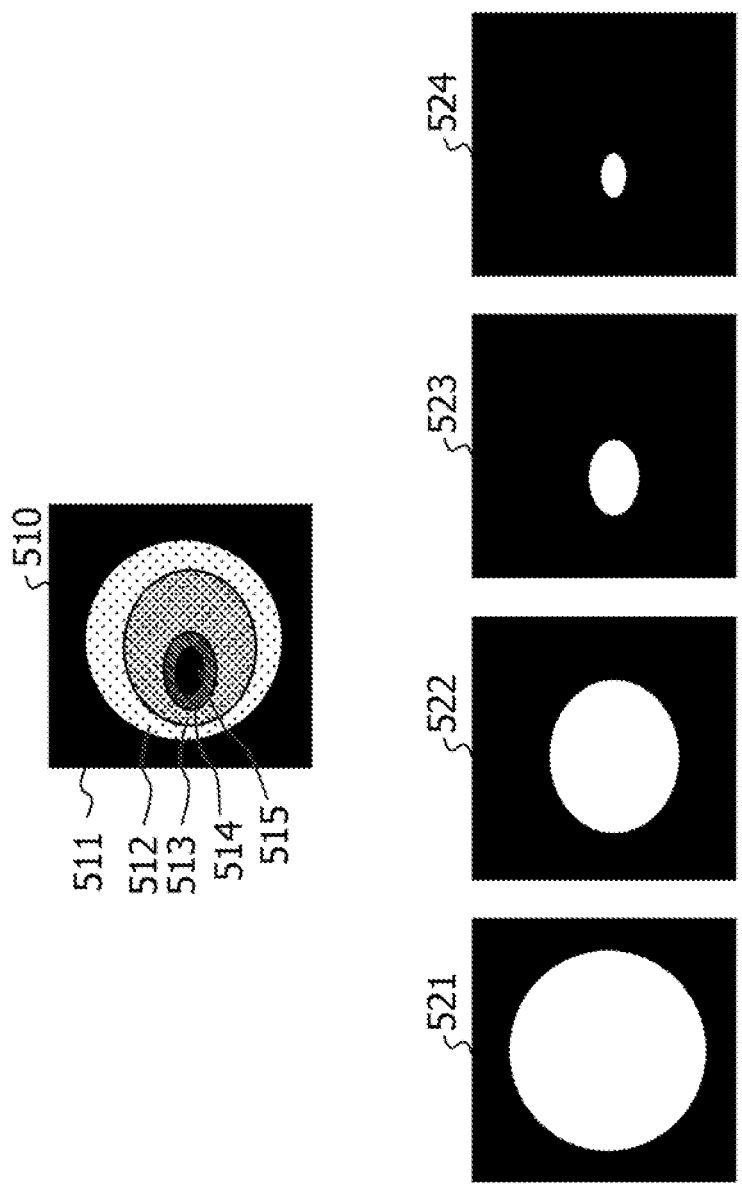
FIG. 5 illustrates an example of change in a changeable region and an unchangeable region.

(2-1) Specific Example of Process of Change Region Limiting Information Generating Unit First, a specific example of the process of the change region limiting information generating unit 321 included in the specifying unit 143 is described. FIG. 5 illustrates an example of change in a changeable region and an unchangeable region. In the case of FIG. 5, the degree-of-attention map 510 generated by the map generating unit 142 contains 5 image portions having different levels of degrees of attention.

Specifically, for example, an image portion 511 of the degree-of-attention map 510 is an image portion having the first level of degree of attention. Similarly, image portions 512 to 515 are image portions having the second level to the fifth level of degrees of attention, respectively.

As described above, when defining a changeable region and an unchangeable region, the change region limiting information generating unit 321 gradually increases the level in accordance with the instruction from the judging unit 325 to narrow the changeable region and widen the unchangeable region.

In FIG. 5, the images 521 to 524 are diagrams schematically illustrating changeable regions and unchangeable regions defined by the change region limiting information generating unit 321, where white portions represent changeable regions and black portions represent unchangeable regions.

Specifically, for example, the image 521 indicates that the change region limiting information generating unit 321 has defined an image portion having a degree of attention of the second level or higher as a changeable region and has defined an image portion having a degree of attention of lower than the second level as a unchangeable region in the degree-of-attention map 510.

Similarly, the image 522 indicates that the change region limiting information generating unit 321 has defined an image portion having a degree of attention of the third level or higher as a changeable region and has defined an image portion having a degree of attention of lower than the third level as a unchangeable region in the degree-of-attention map 510.

Likewise, the image 523 and the image 524 indicate that the change region limiting information generating unit 321 has defined image portions having degrees of attention of the fourth level or higher and of the fifth level or higher as changeable regions and has defined image portions having degrees of attention of lower than the fourth level and of lower than the fifth level as unchangeable regions, respectively.

Figure 6:
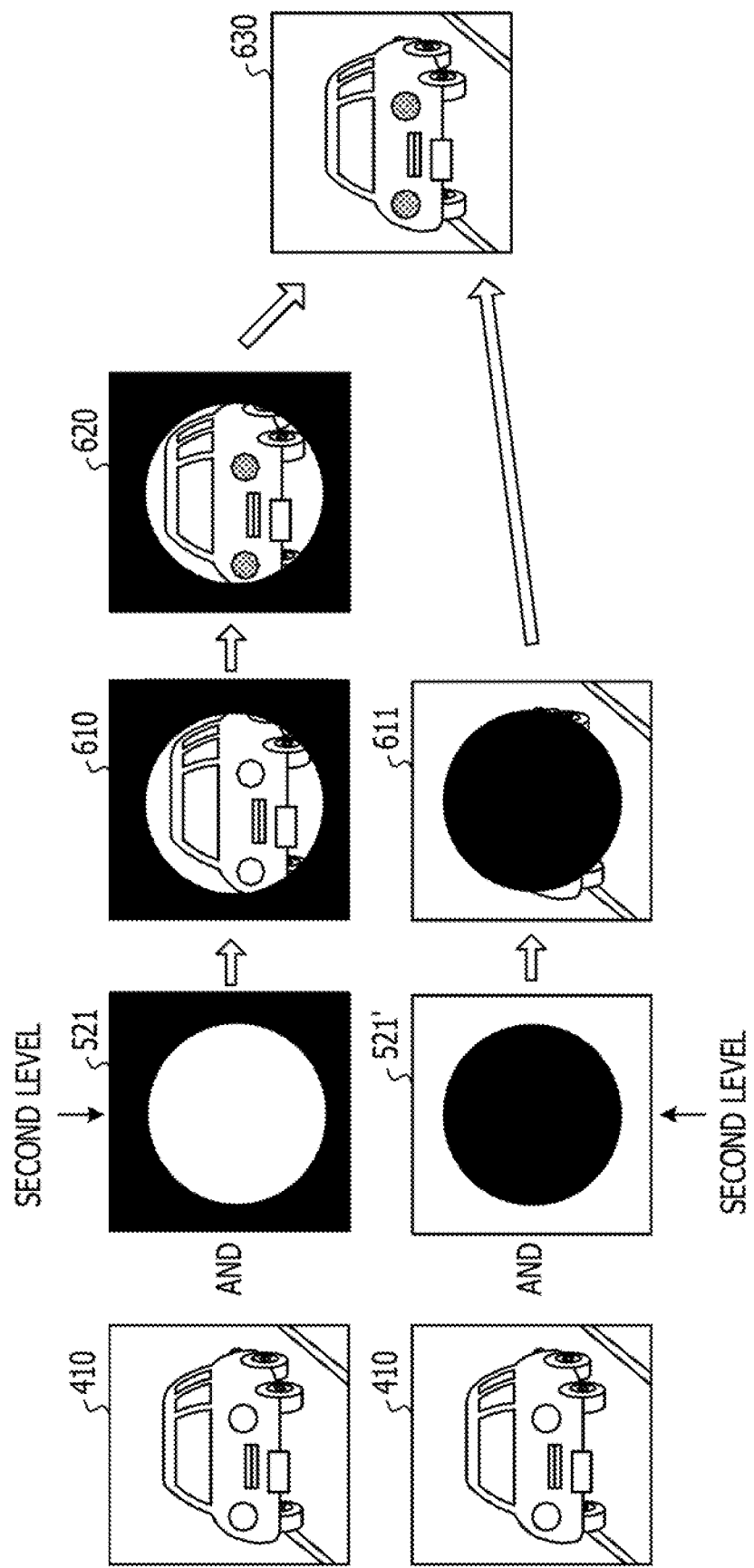
FIG. 6 is a first diagram illustrating a specific example of processes until a synthesis image is generated.

(2-2) Specific Example of Processes of ask Image Generating Unit, Region Extracting Unit, and Synthesizing Unit Next, a specific example of the processes of the mask image generating unit 322, the region extracting unit 323, and the synthesizing unit 324 (the processes until a synthesis image is generated) included in the specifying unit 143 is described. FIG. 6 is a first diagram illustrating the specific example of the processes until a synthesis image is generated. In the upper stage of FIG. 6, the image 521 represents a changeable region and an unchangeable region, which the change region limiting information generating unit 321 has defined based on the second level, as a white portion and a black portion, respectively.

As illustrated in the upper stage of FIG. 6, the mask image generating unit 322 masks an image portion (black portion) corresponding to the unchangeable region in an incorrect inference image 410 to generate a mask image 610 in which an image portion (white portion) corresponding to the changeable region is not masked. The region extracting unit 323 acquires a refine image 620 generated by the image refiner unit 301 changing the mask image 610. The region extracting unit 323 extracts the image portion corresponding to the changeable region from the acquired refine image 620.

On the other hand, in the lower stage of FIG. 6, the image 521' represents a changeable region and an unchangeable region, which the change region limiting information generating unit 321 has defined based on the second level, as a black portion and a white portion, respectively. The image 521' is an image obtained by inverting the white portion and the black portion of the image 521 (for the sake of explanation, in the lower stage of FIG. 6, the white portion represents the unchangeable region and the black portion represents the changeable region).

As illustrated in the lower stage of FIG. 6, the region extracting unit 323 extracts an image portion 611 corresponding to the unchangeable region from the incorrect inference image 410.

A synthesis image 630 illustrated in FIG. 6 is a synthesis image obtained by synthesizing the image portion corresponding to the changeable region, which has been extracted from the refine image 620, and the image portion 611 corresponding to the unchangeable region, which has been extracted from the incorrect inference image 410.

Although the example of FIG. 6 illustrates the processes until the synthesis image 630 is generated using the changeable regions and the unchangeable regions defined based on the second level, the same processes are performed also for the third level to the fifth level to successively generate synthesis images.

(2-3) Specific Example of Process of judging Unit

Figure 7:
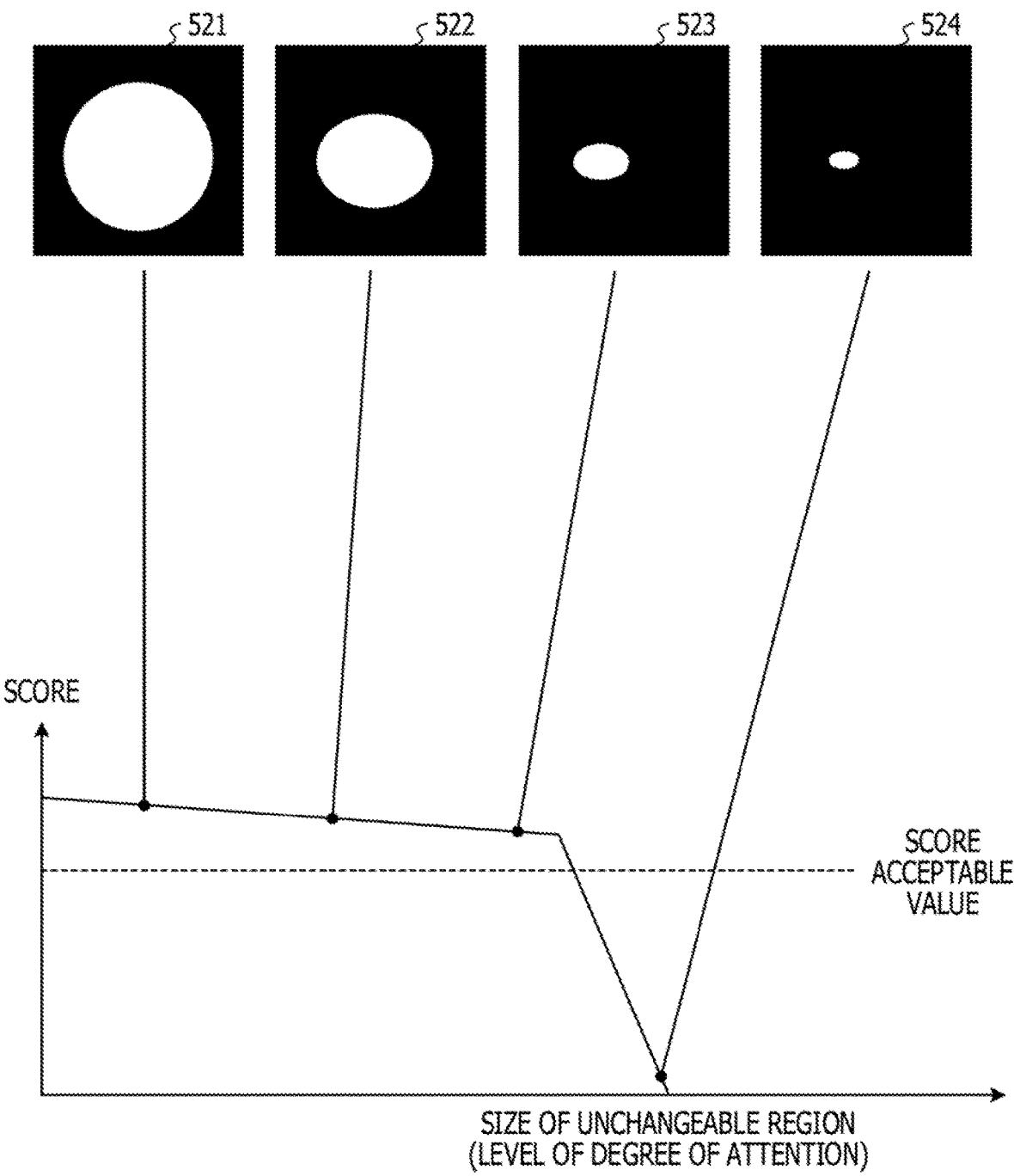
FIG. 7 illustrates a specific example of the process of a judging unit.

Next, a specific example of the process of the judging unit 325 included in the specifying unit 143 is described. FIG. 7 illustrates a specific example of the process of the judging unit. In FIG. 7, the horizontal axis represents the size of an unchangeable region defined by the change region limiting information generating unit 321 (which alternatively may be the level of the degree of attention). In FIG. 7, the vertical axis represents the score acquired by the judging unit 325.

As illustrated in FIG. 7, as the size of the unchangeable region increases (as the changeable region is narrowed), the correct label score acquired by the judging unit 325 decreases. The judging unit 325 monitors the transition of the correct label score and when the correct label score falls below the predetermined score acceptable value, notifies the change region limiting information generating unit 321 of that effect.

This allows the change region limiting information generating unit 321 to specify the changeable region immediately before the correct label score falls below the score acceptable value as an image section that causes incorrect inference.

In the example of FIG. 7, the correct label score falls below the score acceptable value in the transition from the correct label score when the unchangeable region represented by the image 523 is defined to the correct label score when the unchangeable region represented by the image 524 is defined. Hence, the change region limiting information generating unit 321 specifies the changeable region represented by the white portion in the image 523 as an image section that causes incorrect inference.

<Flow of Incorrect Inference Cause Extracting Process>

Figure 8:
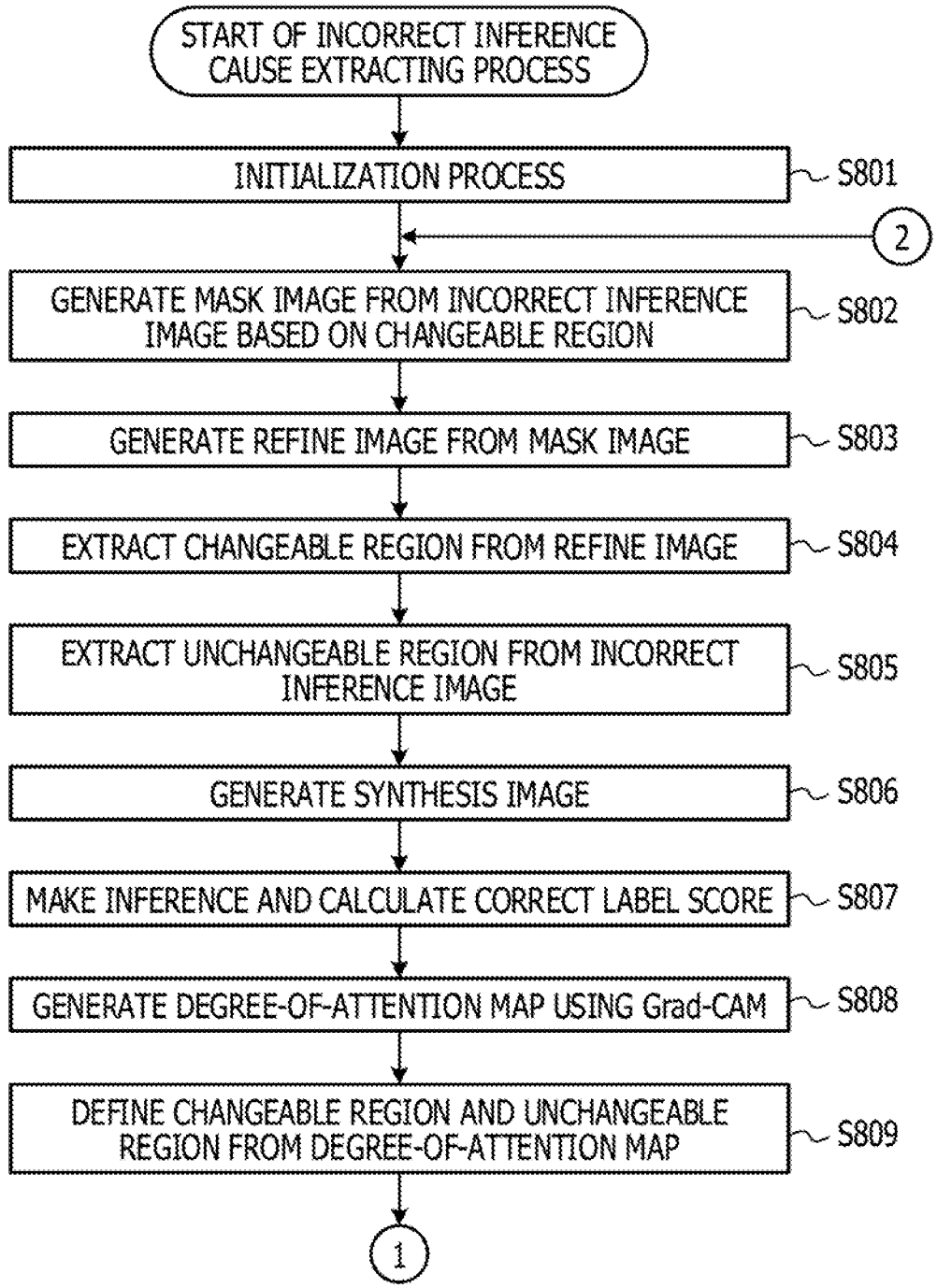
FIG. 8 is a first flowchart illustrating the flow of an incorrect inference cause extracting process.
Figure 9:
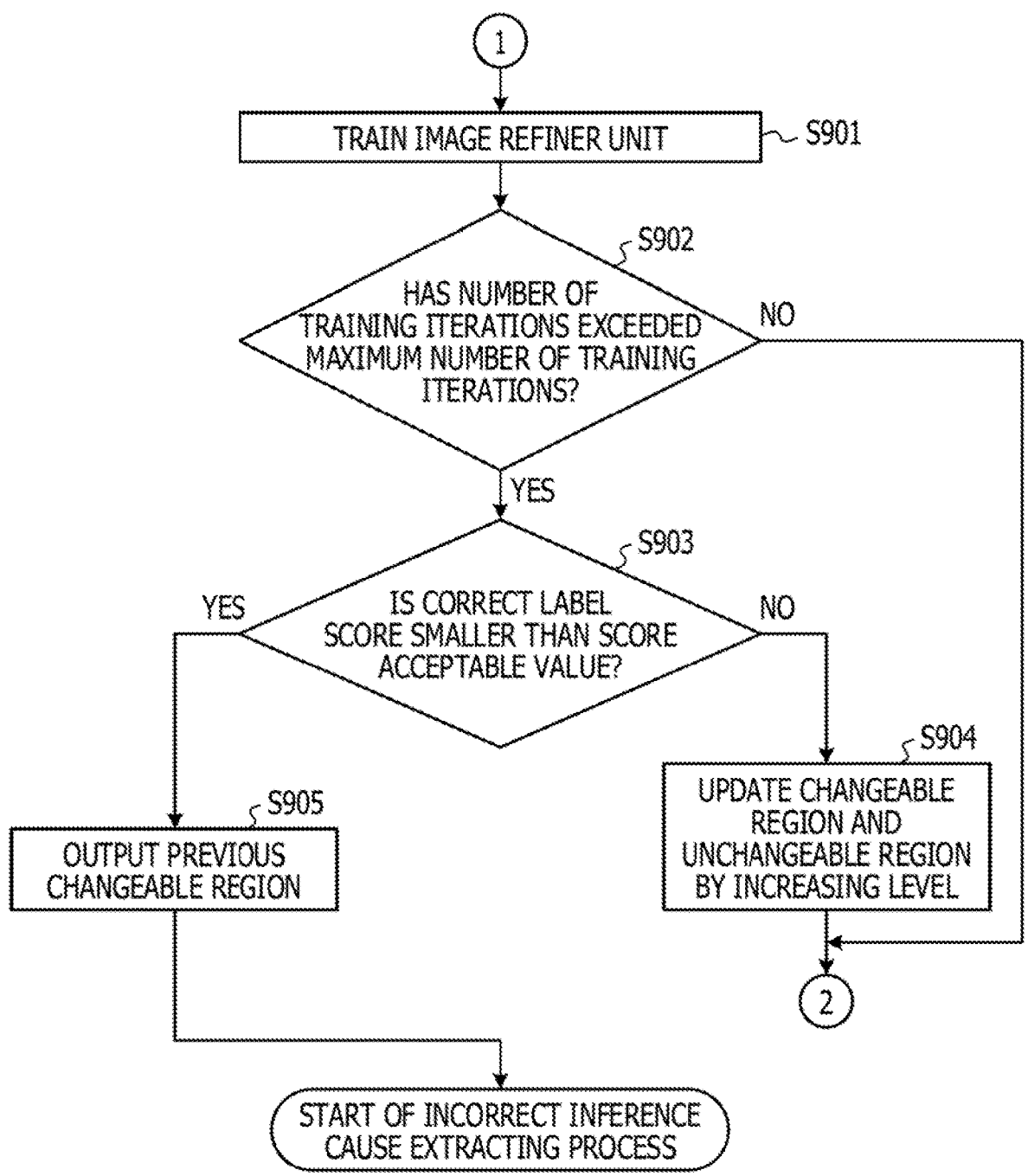
FIG. 9 is a second flowchart illustrating the flow of the incorrect inference cause extracting process.

Next, the flow of an incorrect inference cause extracting process performed by the incorrect inference cause extracting unit 140 is described. FIGS. 8 and 9 are first and second flowcharts illustrating the flow of the incorrect inference cause extracting process.

In step S801, each unit of the incorrect inference cause extracting unit 140 performs an initialization process. For example, the image refiner unit 301 sets the number of training iterations for the CNN which outputs a refine image to zero and sets the maximum number of training iterations to a value instructed by the user. The change region limiting information generating unit 321 sets the initial values to levels used to define the changeable region and unchangeable region (sets the changeable region to the entire incorrect inference image and the unchangeable region to zero).

In step S802, the mask image generating unit 322 acquires the changeable region and the unchangeable region from the change region limiting information generating unit 321 (the changeable region is the entire incorrect inference image and the unchangeable region is zero). The mask image generating unit 322 generates a mask image based on the acquired changeable region and unchangeable region.

In step S803, the image refiner unit 301 changes the mask image to generate a refine image.

In step S804, the region extracting unit 323 extracts an image portion corresponding to the changeable region from the refine image.

In step S805, the region extracting unit 323 extracts an image portion corresponding to the unchangeable region from the incorrect inference image.

In step S806, the synthesizing unit 324 synthesizes the image portion corresponding to the changeable region, which has been extracted from the refine image, and the image portion corresponding to the unchangeable region, which has been extracted from the incorrect inference image, to generate a synthesis image.

In step S807, the inferring unit 303 makes inference with the synthesis image as an input to calculate the correct label score.

In step S808, the attention region deriving unit 311 generates a degree-of-attention map using the Grad-CAM method based on the inferring unit structural information and the feature map at the time of making inference in step S807.

In Step S809, the change region limiting information generating unit 321 defines an image portion having a degree of attention of a predetermined level or higher as a changeable region and defines an image portion having a degree of attention of lower than the predetermined level as a unchangeable region in the degree-of-attention map.

Subsequently, in step S901 in FIG. 9, the image refiner unit 301 conducts CNN training using an image difference value and a score error.

In step S902, the image refiner unit 301 determines whether the number of training iterations has exceeded the maximum number of training iterations. In step S902, when the number of training iterations is determined not to have exceeded the maximum number of training iterations (No in step S902), the process returns to step S802 and the generation of a refine image is continued.

On the other hand, in step S902, when the number of training iterations is determined to have exceeded the maximum number of training iterations (Yes in step S902), the process proceeds to step S903. At this time, the score-maximized refine image has been stored in the refine image storing unit 305.

In step S903, the judging unit 325 determines whether the correct label score calculated in step S807 is smaller than the score acceptable value. In step S903, when the correct label score is determined to be larger than or equal to the score acceptable value (No in step S903), the process proceeds to step S904.

In step S904, the change region limiting information generating unit 321 updates the changeable region and the unchangeable region by increasing the level, and the process returns to step S802 in FIG. 8.

On the other hand, in step S903, when the correct label score is determined to be smaller than the score acceptable value (Yes in step S903), the process proceeds to step S905.

In step S905, the change region limiting information generating unit 321 specifies the previous changeable region as an image section that causes incorrect inference and outputs the changeable region.

As is clear from the above description, the analysis apparatus 100 according to the first embodiment generates the refine image while changing the incorrect inference image such that the correct label score of inference is maximized. The analysis apparatus 100 according to the first embodiment generates the degree-of-attention map using the Grad-CAM method from the inferring unit structural information at the time of making inference with the synthesis image containing the refine image as an input. The analysis apparatus 100 according to the first embodiment makes inference by inputting, to the inferring unit, the incorrect inference image in which the changeable region defined based on the generated degree-of-attention map (the region that affects the correct label inference) is replaced with the refine image. The analysis apparatus 100 according to the first embodiment specifies an image section that causes incorrect inference by narrowing the changeable region from the inferred correct label score.

In this way, by replacing a region that affects correct label inference with a refine image and narrowing the region while referring to the effect of replacement, it is possible to specify the image section that causes incorrect inference with high precision. In other words, for example, according to the first embodiment, it is possible to improve the precision at the time of specifying an image section that causes incorrect inference.

Second Embodiment

In the above-described first embodiment, description is made in which the score-maximized refine image is generated from the mask image. In a second embodiment, a score-maximized refine image is generated from an incorrect inference image. With this, the score-maximized refine image does not have to be generated every time the changeable region and the unchangeable region are updated, and it is possible to reduce the processing load of the analysis apparatus 100 at the time of the incorrect inference cause extracting process. Hereinafter, the second embodiment is described by focusing on a difference from the above-described first embodiment.

<Functional Configuration of Incorrect Inference Cause Extracting Unit>

Figure 10:
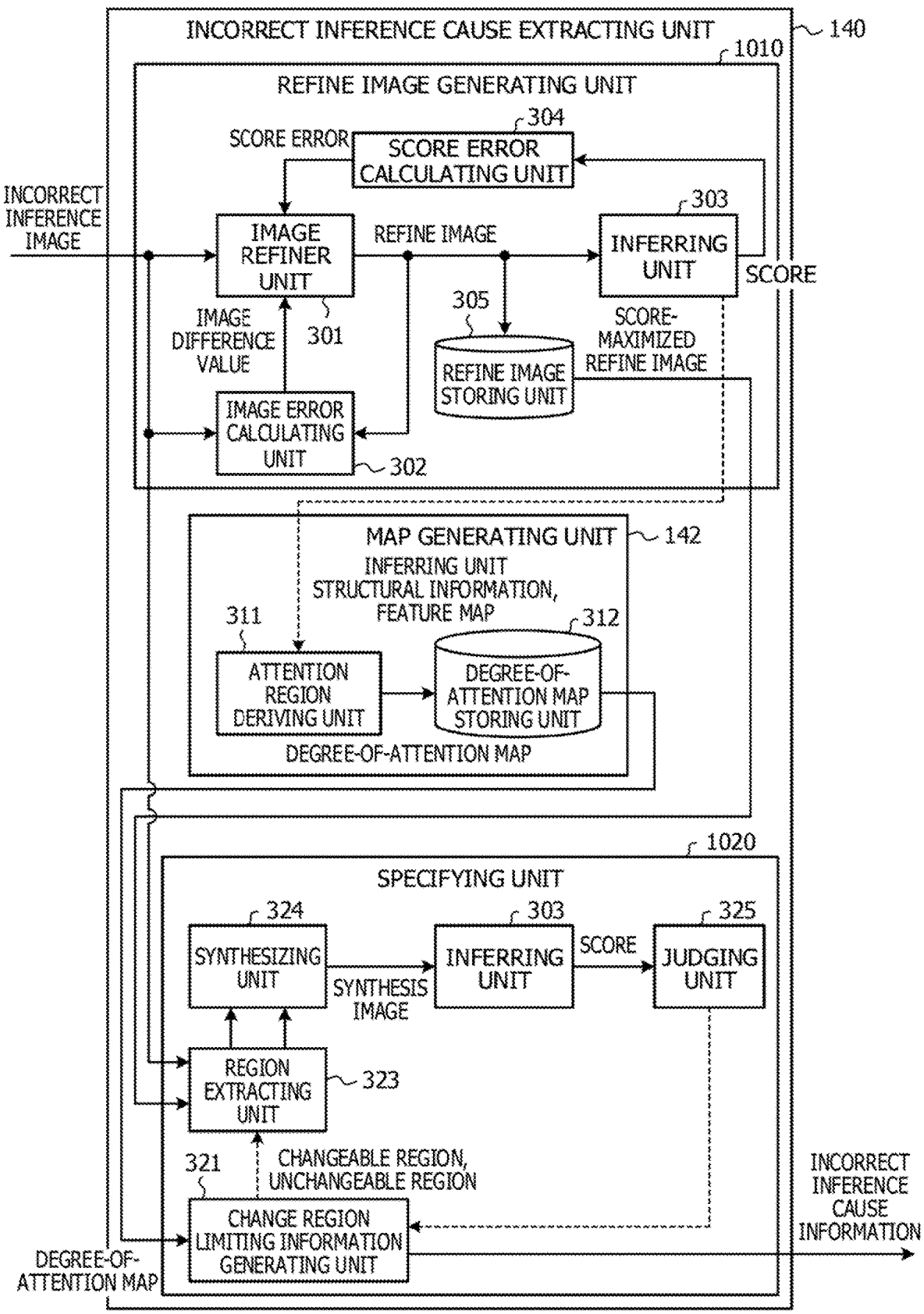
FIG. 10 is a second diagram illustrating an example of the functional configuration of the incorrect inference cause extracting unit.

First, the functional configuration of the incorrect inference cause extracting unit in the analysis apparatus 100 according to the second embodiment is described. FIG. 10 is a second diagram illustrating an example of the functional configuration of the incorrect inference cause extracting unit. The difference from the functional configuration of the incorrect inference cause extracting unit illustrated in FIG. 3 is that the functions of a refine image generating unit 1010 and a specifying unit 1020 are different from those of the refine image generating unit 141 and the specifying unit 143 in FIG. 3.

(1) Detail of Refine Image Generating Unit

As illustrated in FIG. 10, in the refine image generating unit 1010, an incorrect inference image is inputted to the image refiner unit 301. A refine image outputted by the image refiner unit 301 is inputted to the inferring unit 303. In this way, the refine image generating unit 1010 generates a score-maximized refine image from the incorrect inference image.

(2) Detail of Specifying Unit

As illustrated in FIG. 10, the specifying unit 1020 does not include the mask image generating unit 322, and the changeable region and the unchangeable region defined by the change region limiting information generating unit 321 are given only to the region extracting unit 323.

Although because of the sheet space, the specifying unit 1020 in FIG. 10 is illustrated to include the inferring unit 303, the inferring unit 303 is the same as the inferring unit 303 included in the refine image generating unit 1010.

Specific Example of Processes of Specifying Unit

Figure 11:
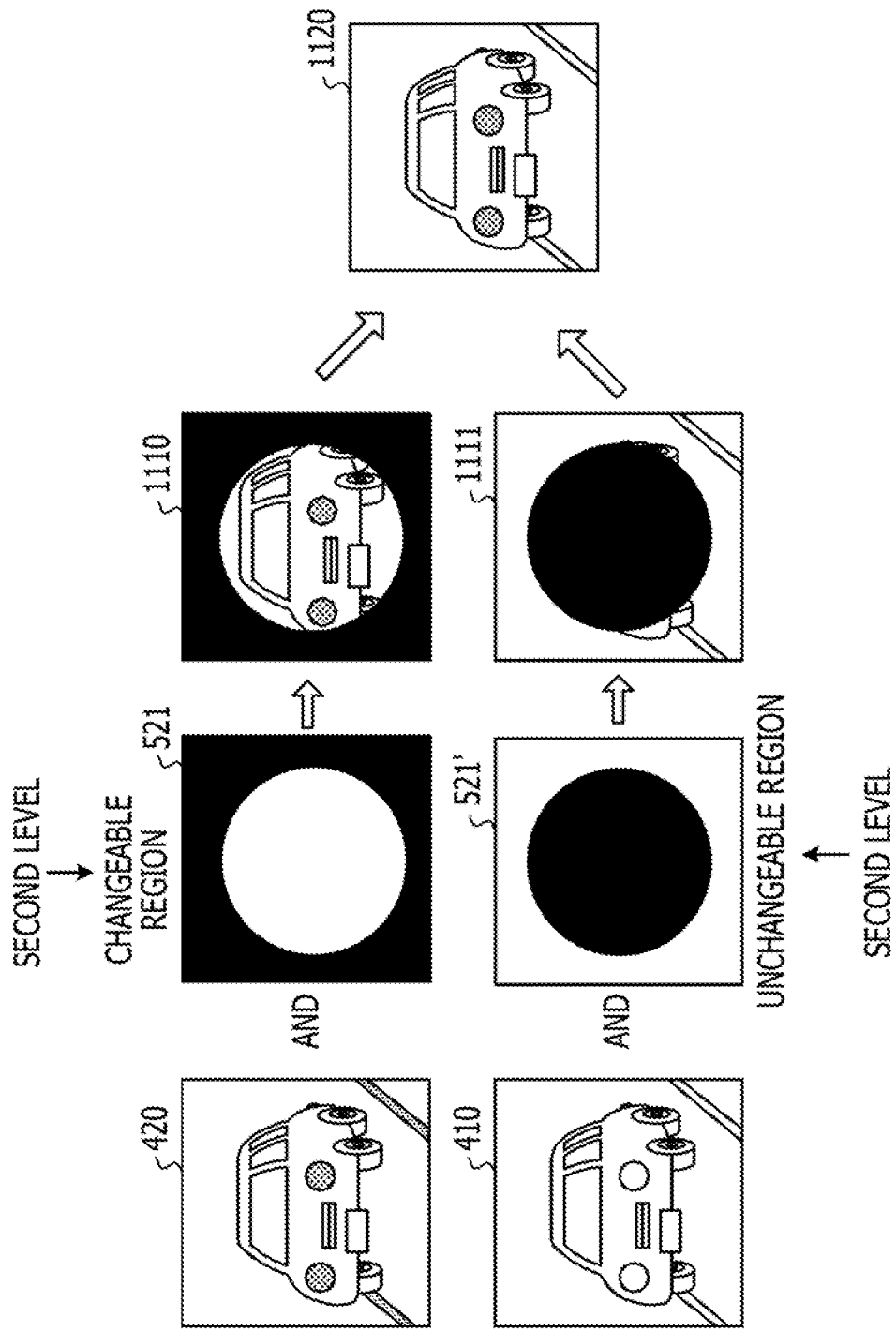
FIG. 11 is a second diagram illustrating a specific example of processes until a synthesis image is generated.

Next, a specific example of the processes until a synthesis image is generated in the specifying unit 1020 is described. FIG. 11 is a second diagram illustrating the specific example of the processes until a synthesis image is generated. In the upper stage of FIG. 11, the image 521 represents a changeable region and an unchangeable region, which the change region limiting information generating unit 321 has defined based on the second level, as a white portion and a black portion, respectively.

As illustrated in the upper stage of FIG. 11, the region extracting unit 323 acquires a score-maximized refine image 420 generated by the image refiner unit 301 changing an incorrect inference image 410. The region extracting unit 323 extracts an image portion 1110 corresponding to the changeable region from the acquired score-maximized refine image 420.

On the other hand, in the lower stage of FIG. 11, the image 521' represents a changeable region and an unchangeable region, which the change region limiting information generating unit 321 has defined based on the second level, as a black portion and a white portion, respectively. The image 521' is an image obtained by inverting the white portion and the black portion of the image 521 (for the sake of explanation, in the lower stage of FIG. 11, the white portion represents the unchangeable region and the black portion represents the changeable region).

As illustrated in the lower stage of FIG. 11, the region extracting unit 323 extracts an image portion 1111 corresponding to the unchangeable region from the incorrect inference image 410.

A synthesis image 1120 illustrated in FIG. 11 is a synthesis image obtained by synthesizing the image portion corresponding to the changeable region, which has been extracted from the score-maximized refine image 420, and the image portion 1111 corresponding to the unchangeable region, which has been extracted from the incorrect inference image 410.

Although the example of FIG. 11 illustrates the processes until the synthesis image 1120 is generated using the changeable regions and the unchangeable regions defined based on the second level, the same processes are performed also for the third level to the fifth level to successively generate synthesis images.

<Flow of Incorrect Inference Cause Extracting Process>

Figure 12:
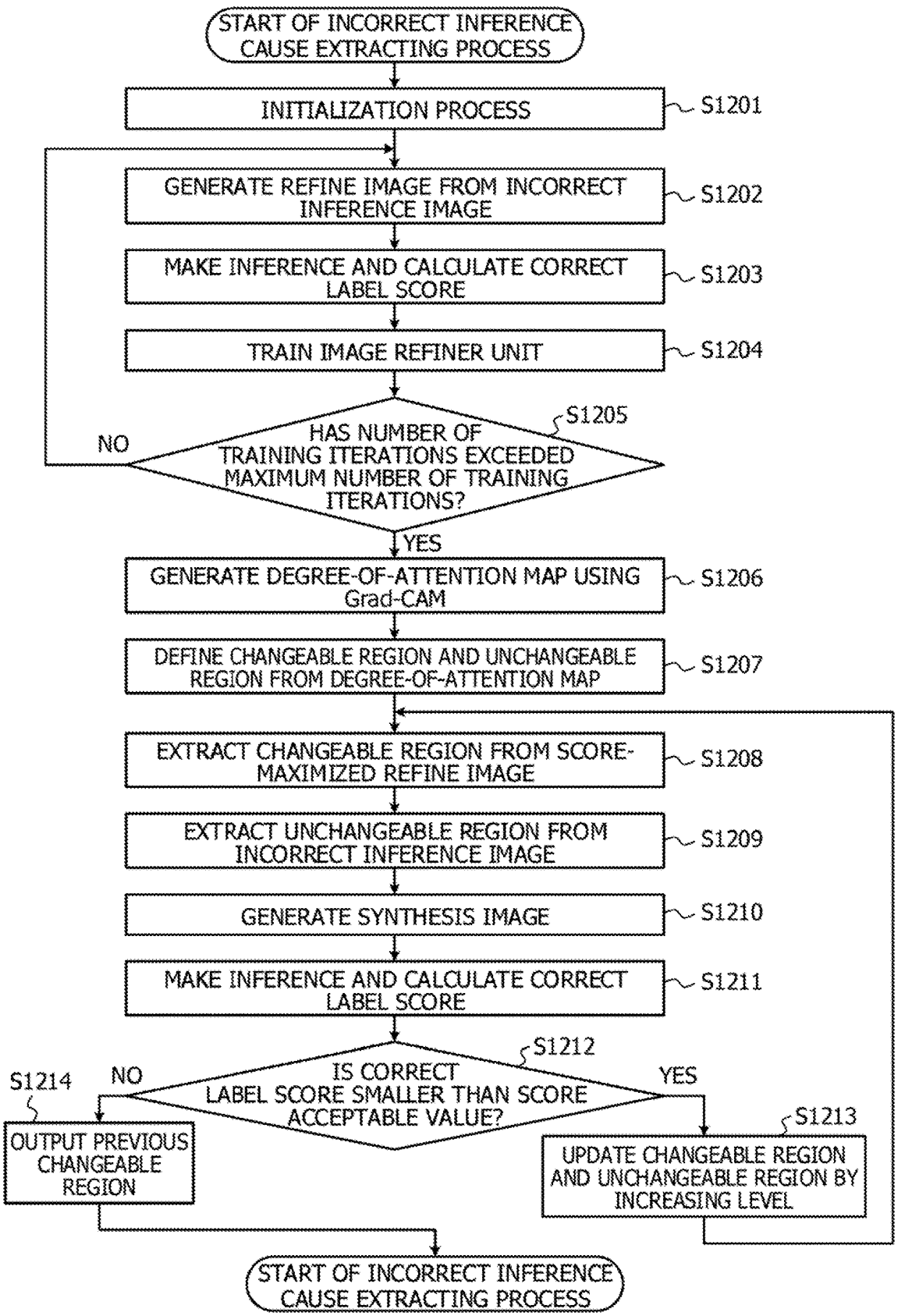
FIG. 12 is a third flowchart illustrating the flow of the incorrect inference cause extracting process.

Next, the flow of an incorrect inference cause extracting process of the incorrect inference cause extracting unit 140 in the analysis apparatus 100 according to the second embodiment is described. FIG. 12 is a third flowchart illustrating the flow of the incorrect inference cause extracting process.

In step S1201, each unit of the incorrect inference cause extracting unit 140 performs an initialization process. For example, the image refiner unit 301 sets the number of training iterations for the CNN to zero and sets the maximum number of training iterations to a value instructed by the user. The change region limiting information generating unit 321 sets the initial values to levels used to define the changeable region and unchangeable region (for example, sets them to the second level).

In step S1202, the image refiner unit 301 changes the incorrect inference image to generate a refine image.

In step S1203, the inferring unit 303 makes inference with the refine image as an input to calculate the correct label score.

In step S1204, the image refiner unit 301 conducts CNN training using an image difference value and a score error.

In step S1205, the image refiner unit 301 determines whether the number of training iterations has exceeded the maximum number of training iterations. In step S1205, when the number of training iterations is determined not to have exceeded the maximum number of training iterations (No in step S1205), the process returns to step S1202 and the generation of a refine image is continued.

On the other hand, in step S1205, when the number of training iterations is determined to have exceeded the maximum number of training iterations (Yes in step S1205), the process proceeds to step S1206. At this time, the score-maximized refine image has been stored in the refine image storing unit 305.

In step S1206, the attention region deriving unit 311 generates a degree-of-attention map with the Grad-CAM method based on the inferring unit structural information and the feature map at the inference in step S1003.

In Step S1207, the change region limiting information generating unit 321 defines a region having a degree of attention of a predetermined level or higher as a changeable region and defines a region having a degree of attention of lower than the predetermined level as a unchangeable region in the degree-of-attention map.

In step S1208, the region extracting unit 323 extracts an image portion corresponding to the changeable region from the score-maximized refine image.

In step S1209, the region extracting unit 323 extracts an image portion corresponding to the unchangeable region from the incorrect inference image.

In step S1210, the synthesizing unit 324 synthesizes the image portion corresponding to the changeable region, which has been extracted from the score-maximized refine image, and the image portion corresponding to the unchangeable region, which has been extracted from the incorrect inference image, to generate a synthesis image.

In step S1211, the inferring unit 303 makes inference with the synthesis image as an input to calculate the correct label score.

In step S1212, the judging unit 325 determines whether the correct label score calculated in step S1211 is smaller than the score acceptable value. In step S1212, when the correct label score is determined to be larger than or equal to the score acceptable value (No in step S1212), the process proceeds to step S1213.

In step S1213, the change region limiting information generating unit 321 updates the changeable region and the unchangeable region by increasing the level, and the process returns to step S1208.

On the other hand, in step S1212, when the correct label score is determined to be smaller than the score acceptable value (Yes in step S1212), the process proceeds to step S1214.

In step S1214, the change region limiting information generating unit 321 specifies the previous changeable region as an image section that causes incorrect inference and outputs the changeable region.

As is clear from the above description, the analysis apparatus 100 according to the second embodiment generates the score-maximized refine image over the entire incorrect inference image. The analysis apparatus 100 according to the second embodiment generates the degree-of-attention map using the Grad-CAM method from the inferring unit structural information at the time of making inference with the score-maximized refine image as an input. The analysis apparatus 100 according to the second embodiment makes inference by inputting, to the inferring unit, the incorrect inference image in which the changeable region defined based on the generated degree-of-attention map (the region that affects the correct label inference) is replaced with the score-maximized refine image. The analysis apparatus 100 according to the second embodiment specifies an image section that causes incorrect inference by narrowing the changeable region from the inferred correct label score.

In this way, by replacing a region that affects correct label inference with a score-maximized refine image and narrowing the region while referring to the effect of replacement, it is possible to specify the image section that causes incorrect inference with high precision. In other words, for example, according to the second embodiment, it is possible to improve the precision at the time of specifying an image section that causes incorrect inference.

According to the second embodiment, as compared with the above-described first embodiment, it is possible to reduce the number of times of generating a score-maximized refine image, so that the score-maximized refine image does not have to be generated for each mask image. As a result, according to the second embodiment, it is possible to reduce the processing load of the analysis apparatus 100 at the time of the incorrect inference cause extracting process.

Third Embodiment

In the above-described first and second embodiments, the changeable region immediately before the correct label score falls below the predetermined score acceptable value is specified and outputted as an image section that causes incorrect inference. However, the method of outputting an image section that causes incorrect inference is not limited to this. For example, a feature portion visualized by the GBP method may be outputted for only a changeable region immediately before the correct label score falls below the predetermined score acceptable value. This accordingly makes it possible to indicate the cause of incorrect inference within a limited range as compared with the case where a feature portion is visualized by the GBP method for the entire incorrect inference image.

In the above-described first and second embodiments, description is made in which when updating the changeable region and the unchangeable region, the change region limiting information generating unit 321 first sets a low level and gradually increases the level. However, the change region limiting information generating unit 321 may first set a high level and gradually lower the level.

In this case, the judging unit 325 specifies a changeable region immediately after the correct label score inferred by the inferring unit 303 exceeds a predetermined score acceptable value as an image section that causes incorrect inference.

Alternatively, a final image section that causes incorrect inference may be specified using an image section that causes incorrect inference, which is specified in the case of gradually increasing the level, and an image section that causes incorrect inference, which is specified in the case of gradually lowering the level.

Fourth Embodiment

In the above-described first to third embodiments, the changeable region and the unchangeable region are defined based on the degree-of-attention map generated using the Grad-CAM method. However, a map used to define a changeable region and an unchangeable region is not limited to the degree-of-attention map.

Although in the above-described first and second embodiments, the changeable region (region that affects correct label inference) is narrowed by increasing the level for the degree of attention in the degree-of-attention map, the method of narrowing a changeable region is not limited to this.

Hereinafter, a fourth embodiment is described by focusing on a difference from the above-described first to third embodiments.

<Functional Configuration of Incorrect Inference Cause Extracting Unit>

Figure 13:
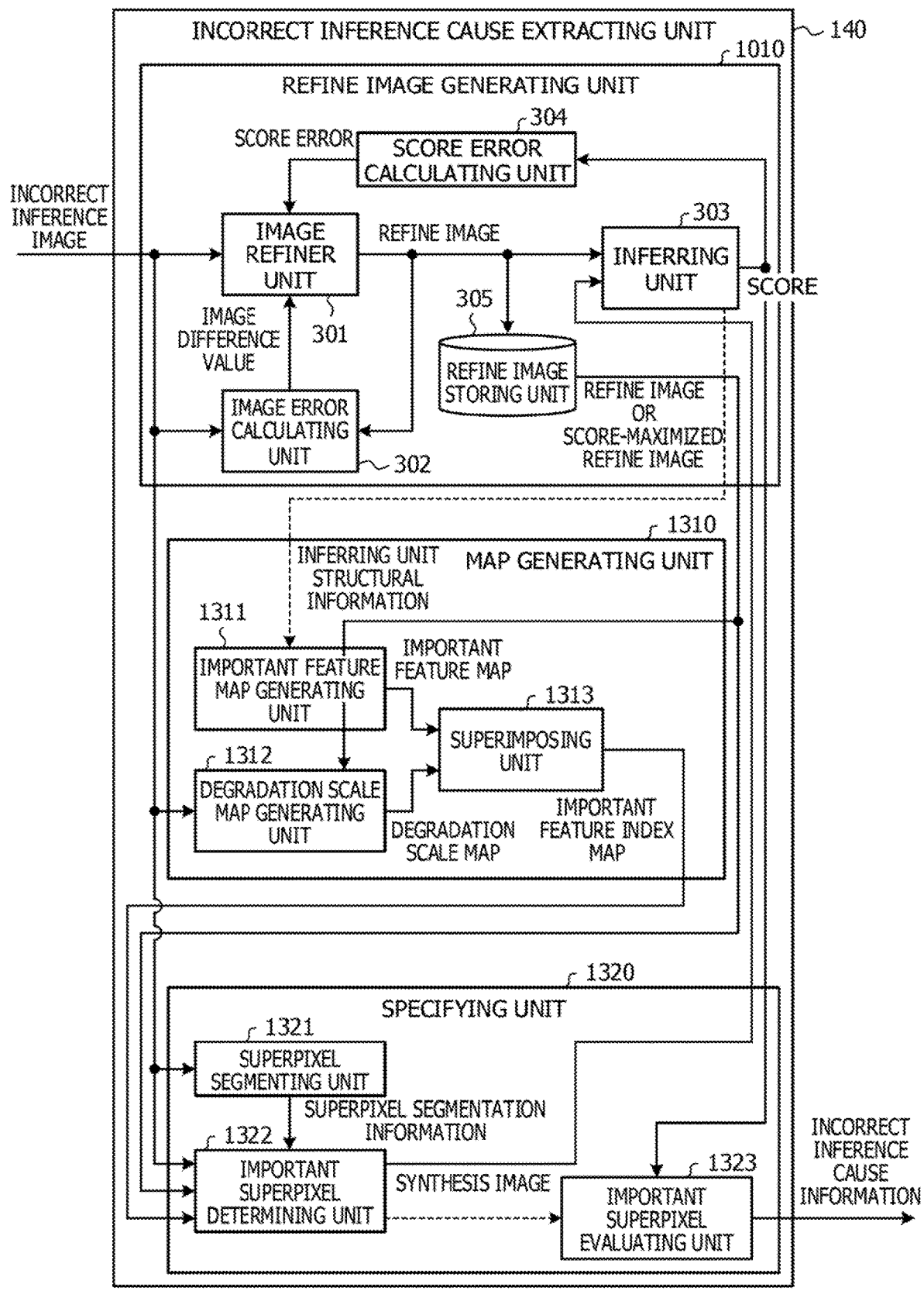
FIG. 13 is a third diagram illustrating an example of the functional configuration of the incorrect inference cause extracting unit.

First, the functional configuration of an incorrect inference cause extracting unit in an analysis apparatus 100 according to the fourth embodiment is described. FIG. 13 is a third diagram illustrating an example of the functional configuration of the incorrect inference cause extracting unit. The differences from the functional configuration of the incorrect inference cause extracting unit illustrated in FIG. 10 are a map generating unit 1310 and a specifying unit 1320, Hereinafter, the detail of the map generating unit 1310 and the specifying unit 1320 is described.

(1) Detail of Map Generating Unit

First, the detail of the map generating unit 1310 is described. As illustrated in FIG. 13, the map generating unit 1310 includes an important feature map generating unit 1311, a degradation scale map generating unit 1312, and a superimposing unit 1313.

The important feature map generating unit 1311 acquires, from the inferring unit 303, inferring unit structural information at the time of making inference with a score-maximized refine image as an input. The important feature map generating unit 1311 generates an "important feature map" based on the inferring unit structural information using the back propagation (BP) method or the guided back propagation (GBP) method. The important feature map is a map in which a feature portion that has reacted in inference is visualized.

The BP method is a method that visualizes a feature portion by calculating an error of each class from a classification probability obtained by making inference with input data whose inferred label is correct (a score-maximized refine image) and imaging the magnitude of a gradient obtained by back-propagating to an input layer. The GBP method is a method that visualizes a feature portion by imaging only a positive value of gradient information as a feature portion.

In generating an important feature map, the process may be conducted using the BP method or the GBP method after only an error of a correct label is maximized. In this case, a feature portion visualized is a feature portion that affects only the correct label score.

The degradation scale map generating unit 1312 generates a "degradation scale map" based on an incorrect inference image and a score-maximized refine image. The degradation scale map is a map that indicates changed portions and the degree of change of each changed portion.

The superimposing unit 1313 superimposes an important feature map which is generated by the important feature map generating unit 1311 and a degradation scale map which is generated by the degradation scale map generating unit 1312 to generate an important feature index map.

(2) Detail of Specifying Unit

Next, the detail of the specifying unit 1320 is described. As illustrated in FIG. 13, the specifying unit 1320 includes a superpixel segmenting unit 1321, an important superpixel determining unit 1322, and an important superpixel evaluating unit 1323.

The superpixel segmenting unit 1321 segments an incorrect inference image into "superpixels" which are regions of each component of an object (a vehicle in the present embodiment) contained in the incorrect inference image and outputs superpixel segmentation information. In segmenting an incorrect inference image into superpixels, an existing segmentation function may be utilized, or CNN or the like trained to segment for each component of a vehicle is utilized.

The important superpixel determining unit 1322 adds up a value of each pixel of the important feature index map generated by the superimposing unit 1313 for each superpixel, based on the superpixel segmentation information outputted by the superpixel segmenting unit 1321.

The important superpixel determining unit 1322 extracts superpixels each having an added value of the added pixels being more than or equal to a predetermined threshold (important feature index threshold) among the superpixels. The important superpixel determining unit 1322 combines the superpixels selected from the extracted superpixels, defines the combined superpixels as a changeable region and defines the superpixels other than the combined superpixels as an unchangeable region.

The important superpixel determining unit 1322 extracts an image portion corresponding to the unchangeable region from the incorrect inference image, extracts an image portion corresponding to the changeable region from the refine image, and synthesizes these image portions to generate a synthesis image. Since refine images the number of which corresponds to the number of training iterations are outputted from the image refiner unit 301, the important superpixel determining unit 1322 generates a synthesis image for each of the number of refine images.

The important superpixel determining unit 1322 increases the number of superpixels to be extracted (widens the changeable region and narrows the unchangeable region) by gradually lowering the important feature index threshold used in defining the changeable region and the unchangeable region. The important superpixel determining unit 1322 updates the changeable region and the unchangeable region while changing the combination of superpixels to be selected from the extracted superpixels.

The important superpixel evaluating unit 1323 acquires a correct label score inferred every time a synthesis image generated by the important superpixel determining unit 1322 is inputted to the inferring unit 303. As described above, the important superpixel determining unit 1322 generates synthesis images the number of which corresponds to the number of refine images outputted by the image refiner unit 301, the number of times of lowering the important feature index threshold, and the number of combinations of superpixels. For this reason, the important superpixel evaluating unit 1323 acquires the correct label scores corresponding to the above number. The important superpixel evaluating unit 1323 specifies a combination of superpixels (changeable region) that causes incorrect inference based on the acquired scores and outputs the specified combination as the incorrect inference cause information.

Specific Example of Process of Each Unit of Incorrect Inference Cause Extracting Unit A specific example of the process of each unit (the map generating unit 1310 and the specifying unit 1320) of the incorrect inference cause extracting unit 140 is described.

(1) Specific Example of Process of Map Generating Unit

Figure 14:
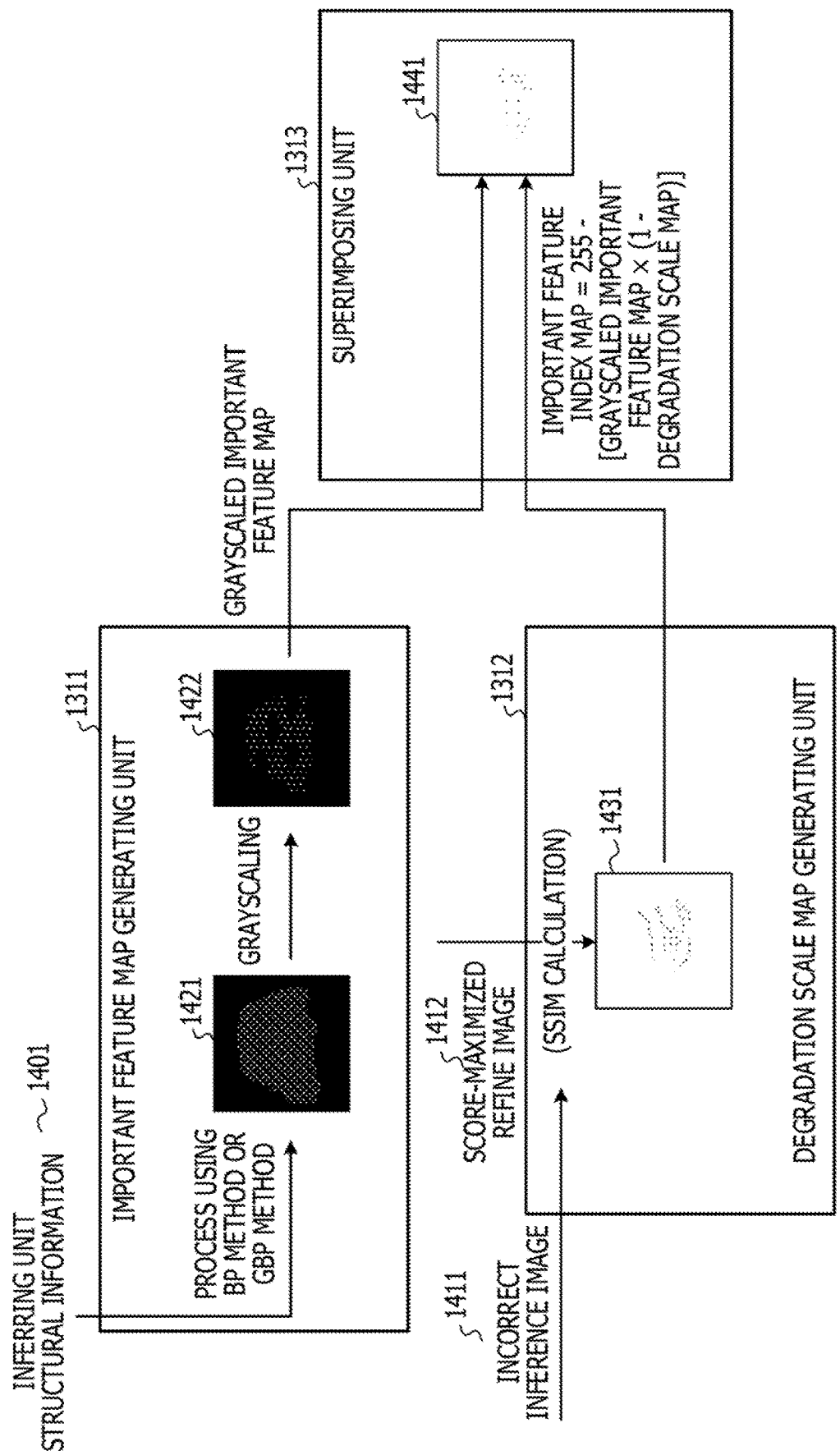
FIG. 14 illustrates a specific example of the process of a map generating unit.

First, a specific example of the process of the map generating unit 1310 is described. FIG. 14 illustrates the specific example of the process of the map generating unit.

As illustrated in FIG. 14, in the map generating unit 1310, the important feature map generating unit 1311 acquires, from the inferring unit 303, inferring unit structural information 1401 at the time when the inferring unit 303 makes inference with a score-maximized refine image as an input. The important feature map generating unit 1311 generates an important feature map 1421 based on the acquired inferring unit structural information 1401. The important feature map generating unit 1311 generates the important feature map 1421 using the BP method or the GBP method.

The important feature map generating unit 1311 grayscales the generated important feature map 1421 to generate a grayscaled important feature map 1422. In the grayscaling process, the important feature map generating unit 1311 may perform the scaling process on the important feature map 1421 and may calculate an absolute value as the value of each pixel.

The grayscaled important feature map 1422 illustrated in FIG. 14 is grayscaled by converting the important feature map 1421 into pixel values of 0 to 255. For this reason, in the grayscaled important feature map 1422, pixels having pixel values close to 255 are pixels that attract attention at the time of making inference, and pixels having pixel values close to 0 are pixels that do not attract attention at the time of making inference.

On the other hand, the degradation scale map generating unit 1312 reads a score-maximized refine image 1412 from the refine image storing unit 305 and performs structural similarity (SSIM) calculation between the score-maximized refine image 1412 and an incorrect inference image 1411. In this way, the degradation scale map generating unit 1312 generates a degradation scale map 1431. The degradation scale map takes values from 0 to 1. The closer to 1 the pixel value, the smaller the difference between the images while the closer to 0 the pixel value, the larger the difference between the images.

The superimposing unit 1313 uses the grayscaled important feature map 1422 which is generated by the important feature map generating unit 1311 and the degradation scale map 1431 which is generated by the degradation scale map generating unit 1312 to generate an important feature index map 1441.

Specifically, for example, the superimposing unit 1313 generates the important feature index map 1441 based on the following equation.

$$\text{The important feature index map} = \text{the grayscaled important feature map} \times (1 - \text{the degradation scale map}) \quad \text{(Equation 1)}$$

In the above equation, the term (1− the degradation scale map) takes a value from 0 to 1. The closer to 1 the value, the larger the difference between the images while the closer to 0 the value, the smaller the difference between the images. Hence, the important feature index map 1441 is an image obtained by providing a grayscaled important feature map, which indicates the degree of attention of a pixel that attracts attention at the time of making inference, with the intensity with the magnitude of the difference between the images.

Specifically, for example, the important feature index map 1441 is generated by •reducing the pixel values of the grayscaled important feature map in a portion where the difference between the images is small in the degradation scale map 1431 and •increasing the pixel values of the grayscaled important feature map in a portion where the difference between the images is large in the degradation scale map 1431.

Figure 16:
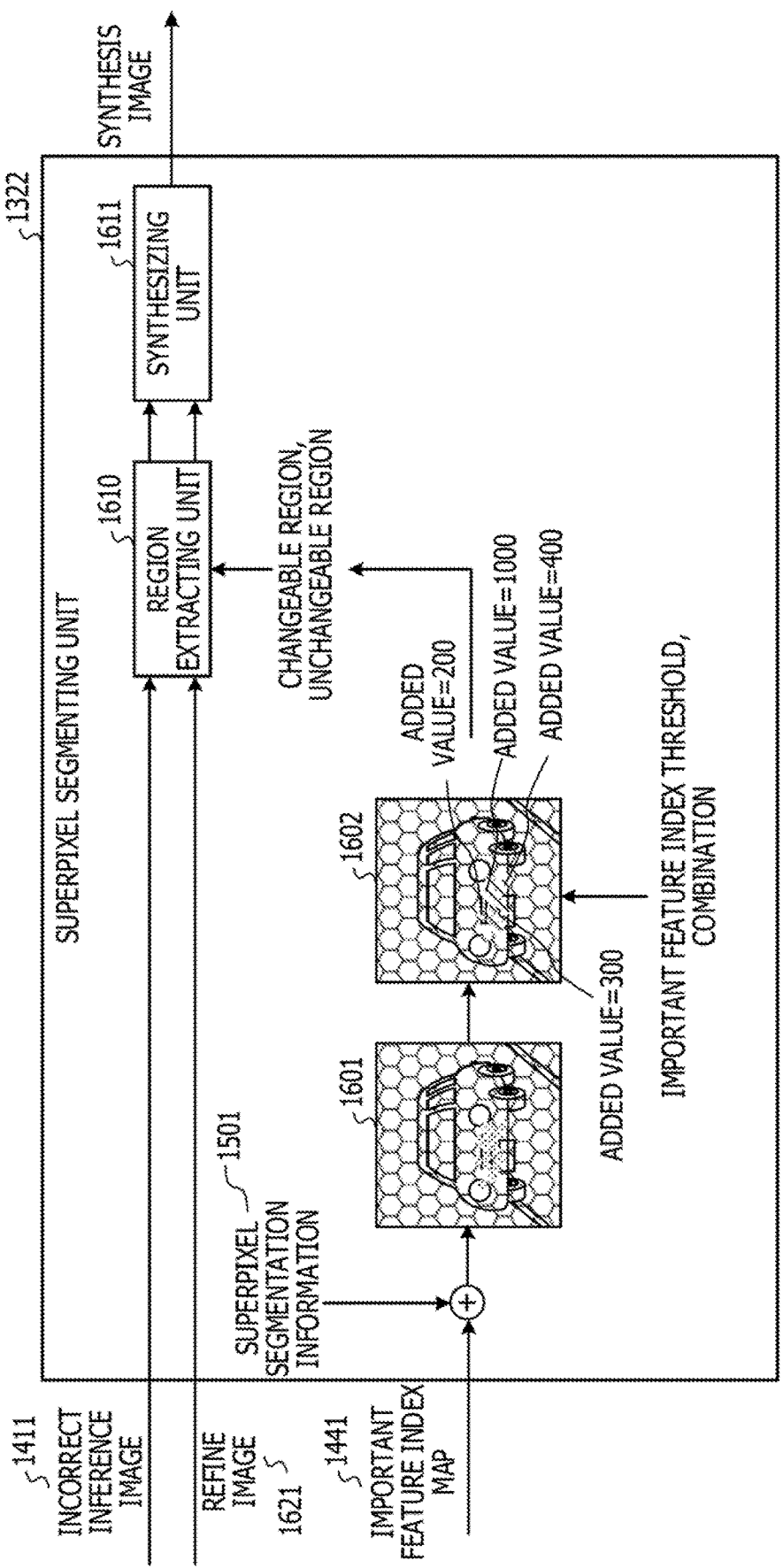
FIG. 16 illustrates a specific example of the process of an important superpixel determining unit.

For more easily recognizable visualization, the important feature index map may be inverted. The important feature index maps illustrated in FIGS. 14 and 16 are those inverted based on the following equation.

$$\text{The (inverted) important feature index map} = 255 - [\text{the grayscaled important feature map} \times (1 - \text{the degradation scale map})] \quad \text{(Equation 2)}$$

The advantages of the superimposing unit 1313 superimposing the grayscaled important feature map 1422 and the degradation scale map 1431 based on the above equation is described.

The grayscaled important feature map 1422 generated by the important feature map generating unit 1311 is nothing other than an attention portion that is calculated by the inferring unit 303 when making inference with the score-maximized refine image as an input and when the correct label score is maximized.

On the other hand, the degradation scale map 1431 generated by the degradation scale map generating unit 1312 represents a changed portion when an incorrect inference image is changed such that the correct label score is maximized and represents a region that causes incorrect inference. Nevertheless, the degradation scale map 1431 generated by the degradation scale map generating unit 1312 is not a minimum region for maximizing the correct label score.

The superimposing unit 1313 superimposes the changed portion when the incorrect inference image is changed such that the correct label score is maximized and the attention portion calculated by the inferring unit 303 to narrow a region to be used to maximize the correct label score. This makes it possible to narrow the region that causes incorrect inference.

Figure 15:
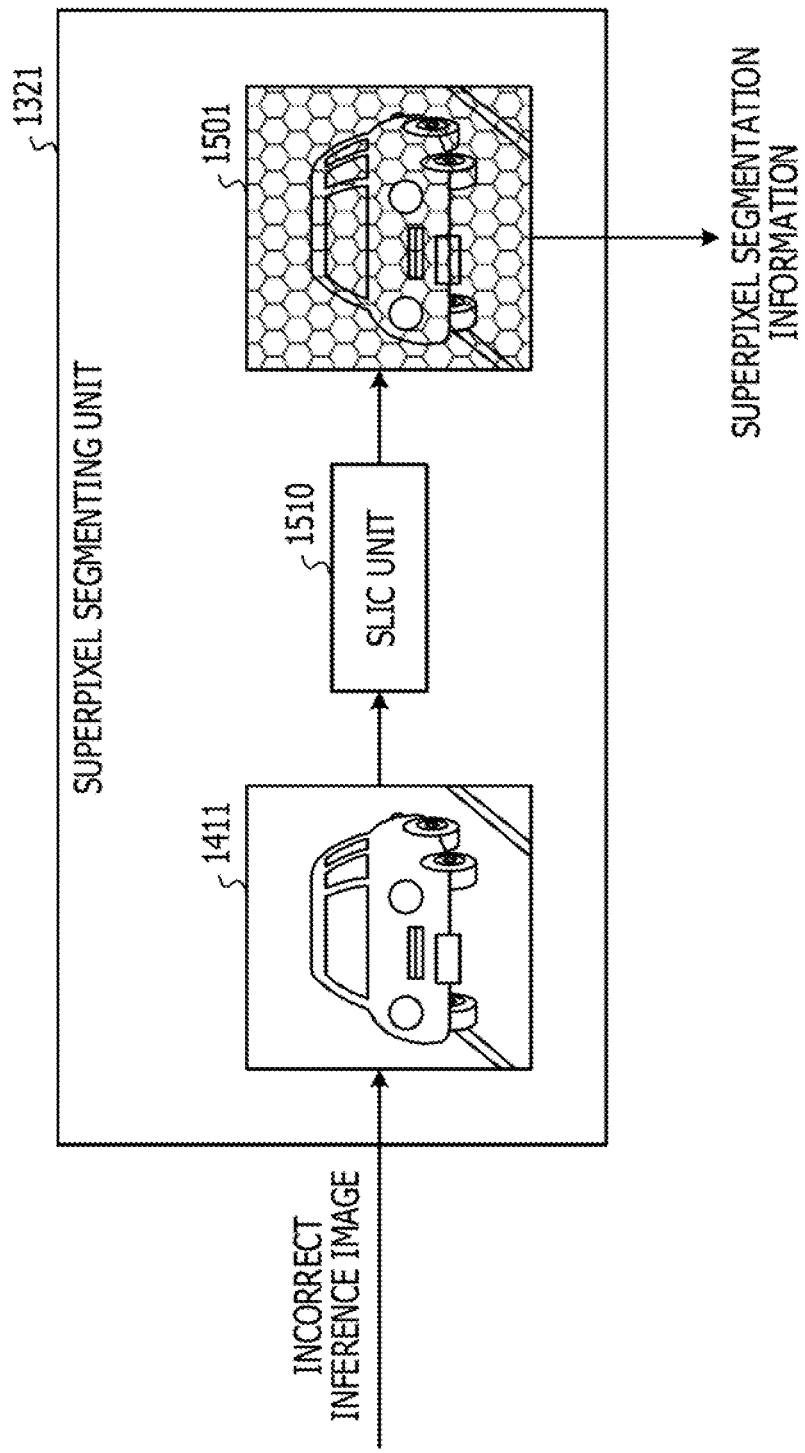
FIG. 15 illustrates a specific example of the process of a superpixel segmenting unit.

(2) Specific Example of Process of Superpixel Segmenting Unit included in Specifying Unit Next, a specific example of the process of the superpixel segmenting unit 1321 included in the specifying unit 1320 is described, FIG. 15 illustrates the specific example of the process of the superpixel segmenting unit. As illustrated in FIG. 15, the superpixel segmenting unit 1321 includes a Simple Linear Iterative Clustering (SLIC) unit 1510 that performs a SLIC process, for example. The SLIC unit 1510 segments the incorrect inference image 1411 into superpixels which are partial images of each component of the vehicle contained in the incorrect inference image 1411. The superpixel segmenting unit 1321 outputs superpixel segmentation information 1501 generated by the segmentation of superpixels by the SLIC unit 1510.

(3) Specific Example of Process of Important Superpixel Determining Unit included in Specifying Unit Next, a specific example of the process of the important superpixel determining unit 1322 included in the specifying unit 1320 is described. FIG. 16 illustrates the specific example of the process of the important superpixel determining unit.

As illustrated in FIG. 16, the important superpixel determining unit 1322 includes a region extracting unit 1610 and a synthesizing unit 1611.

The important superpixel determining unit 1322 superimposes the important feature index map 1441 which is outputted from the superimposing unit 1313 and the superpixel segmentation information 1501 which is outputted from the superpixel segmenting unit 1321. In this way, the important superpixel determining unit 1322 generates an important superpixel image 1601. FIG. 16 depicts an (inverted) important feature index map as the important feature index map 1441.

The important superpixel determining unit 1322 adds up a value of each pixel of the important feature index map 1441 for each superpixel in the generated important superpixel image 1601.

Even when a scaling process has been conducted at the time of generating the important feature index map 1441 in the map generating unit 1310, the adding operation in the important superpixel determining unit 1322 is not affected by the scaling process.

The important superpixel determining unit 1322 determines whether the added value for each superpixel is more than or equal to the important feature index threshold, and extracts superpixels for which the important superpixel determining unit 1322 has determined that the added value is more than or equal to the important feature index threshold. In FIG. 16, the important superpixel mage 1602 clearly illustrates an example of the added value for each superpixel.

The important superpixel determining unit 1322 combines the superpixels selected from the extracted superpixels, defines the combined superpixels as a changeable region and defines the superpixels other than the combined superpixels as an unchangeable region. The important superpixel determining unit 1322 notifies the region extracting unit 1610 of the defined changeable region and unchangeable region.

The region extracting unit 1610 extracts an image portion corresponding to the unchangeable region from the incorrect inference image 1411 and extracts an image portion corresponding to the changeable region from the refine image 1621.

The synthesizing unit 1611 synthesizes the image portion corresponding to the changeable region, which has been extracted from the refine image 1621, and the image portion corresponding to the unchangeable region, which has been extracted from the incorrect inference image 1411, to generate a synthesis image.

Figure 17:
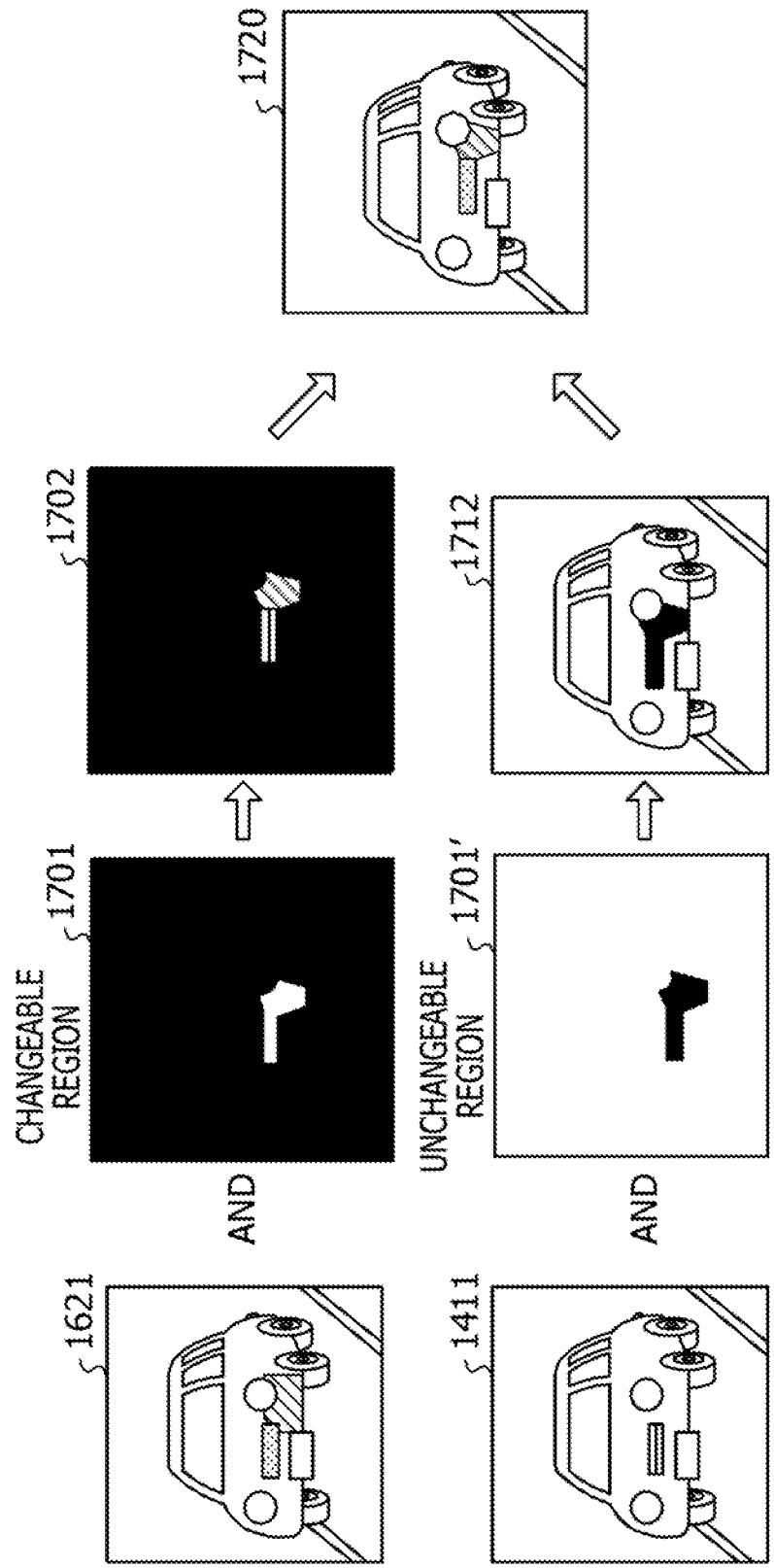
FIG. 17 is a third diagram illustrating a specific example of processes until a synthesis image is generated.

FIG. 17 is a second diagram illustrating a specific example of the processes of the region extracting unit and the synthesizing unit. In FIG. 17, the upper stage illustrates a case where the region extracting unit 1610 extracts an image portion (white portion in the image 170 corresponding to a changeable region from the refine image 1621.

On the other hand, in FIG. 17, the lower stage illustrates a case where the region extracting unit 1610 extracts an image portion (white portion in the image 1701') corresponding to an unchangeable region from the incorrect inference image 1411. The image 1701' is an image obtained by inverting the white portion and the black portion of the image 1701 (for the sake of explanation, in the lower stage of FIG. 17, the white portion is an image portion corresponding to the unchangeable region).

The synthesizing unit 1611, as illustrated in FIG. 17, synthesizes the image portion corresponding to the changeable region in the refine image 1621 and the image portion corresponding to the unchangeable region in the incorrect inference image 1411, which are outputted from the region extracting unit 1610, to generate a synthesis image 1720.

In this way, the specifying unit 1320 makes it possible to narrow down a region to be replaced with the refine image 1621 on a superpixel-to-superpixel basis by using the important feature map 1421 and the degradation scale map 1431 when the synthesis image 1720 is generated.

<Flow of Incorrect Inference Cause Extracting Process>

Figure 18:
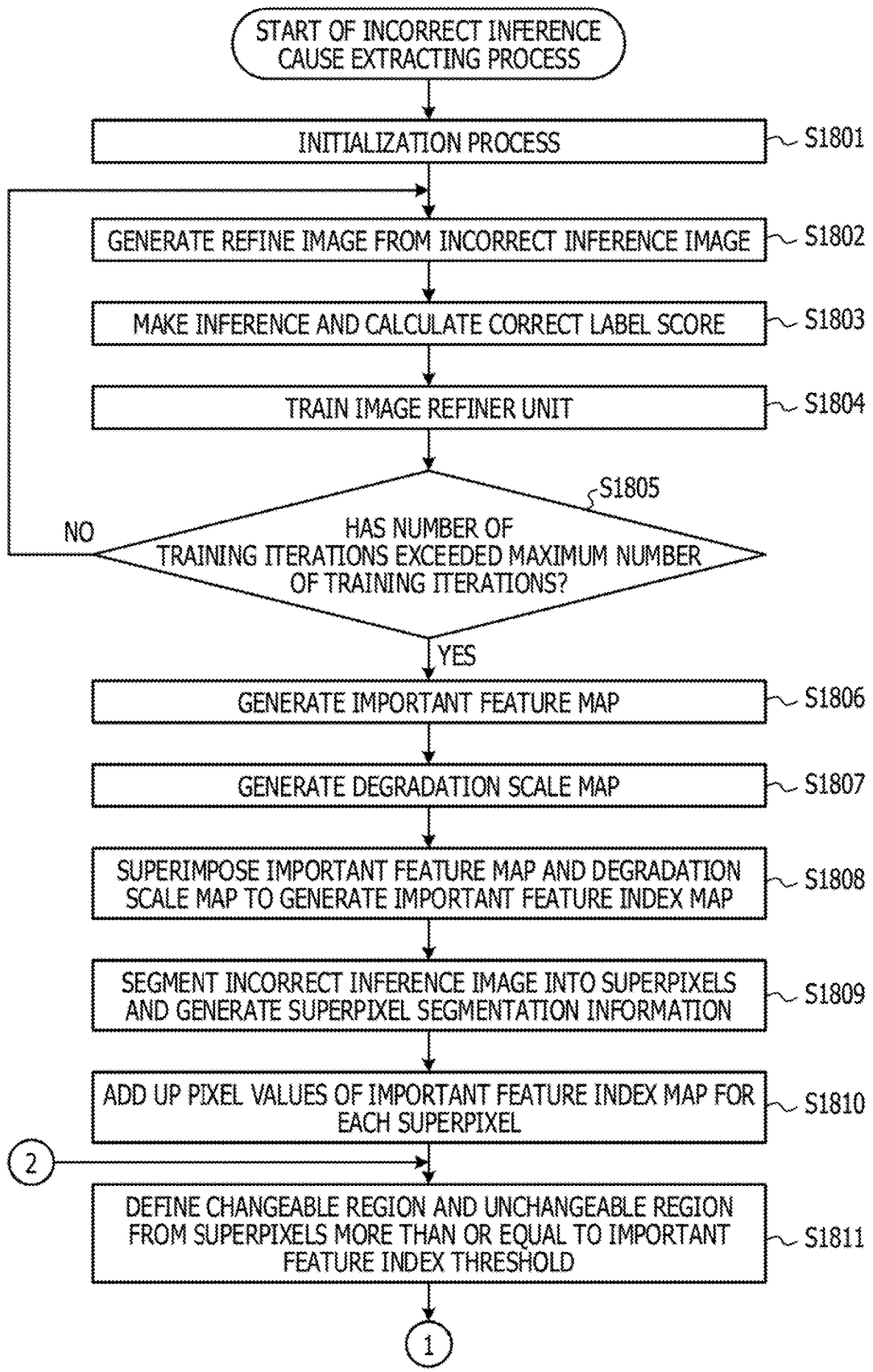
FIG. 18 is a fourth flowchart illustrating the flow of the incorrect inference cause extracting process.
Figure 19:
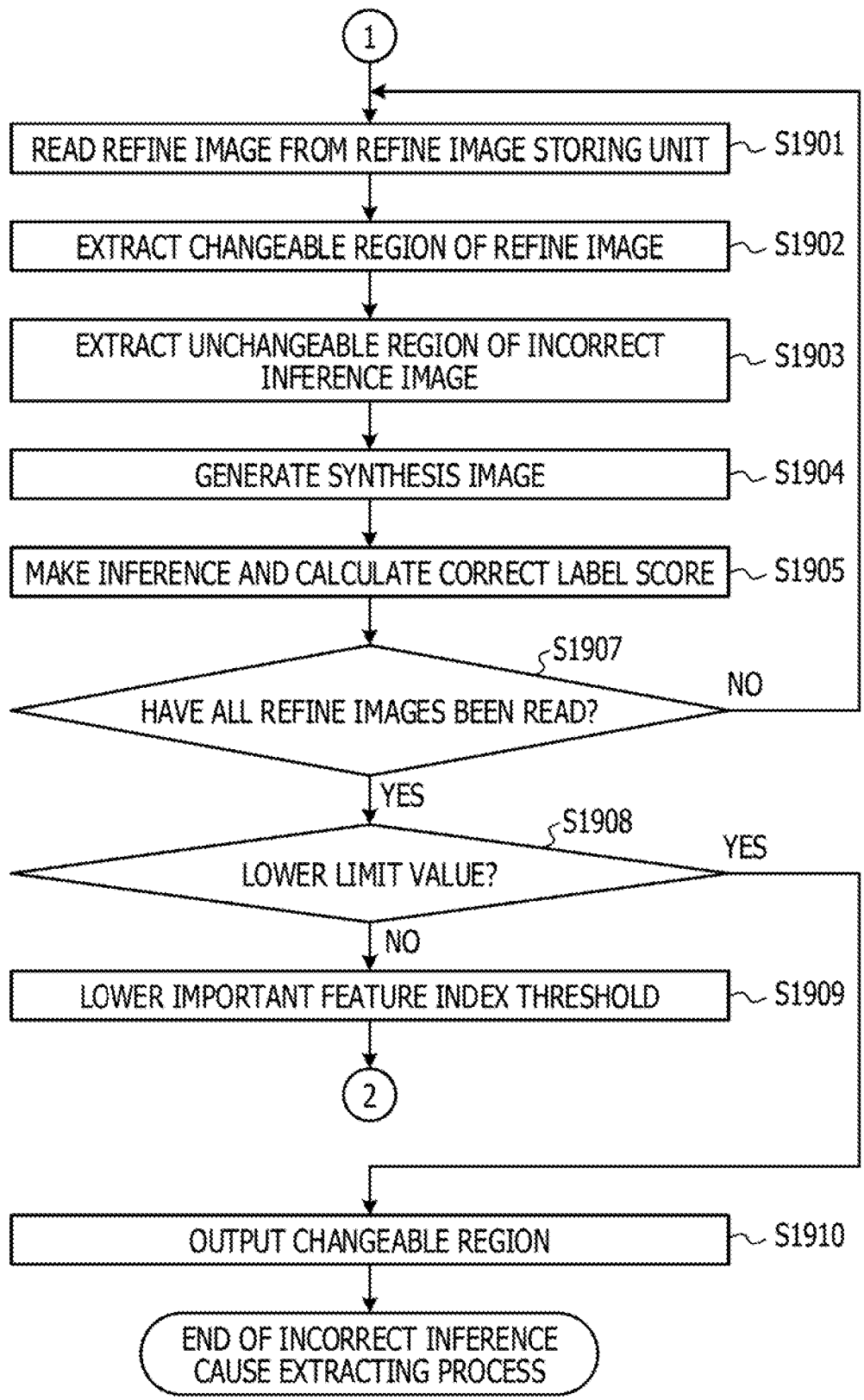
FIG. 19 is a fifth flowchart illustrating the flow of e incorrect inference cause extracting process.

Next, the flow of an incorrect inference cause extracting process performed by the incorrect inference cause extracting unit 140 is described. FIGS. 18 and 19 are fourth and fifth flowcharts illustrating the flow of the incorrect inference cause extracting process.

In step S1801, each unit of the incorrect inference cause extracting unit 140 performs an initialization process. For example, the image refiner unit 301 sets the number of training iterations for the CNN to zero and sets the maximum number of training iterations to a value instructed by the user. The judging unit 325 sets the important feature index threshold and a lower limit value thereof to values instructed by the user.

In step S1802, the image refiner unit 301 changes the incorrect inference image to generate a refine image.

In step S1803, the inferring unit 303 makes inference with the refine image as an input to calculate the correct label score.

In step S1804, the image refiner unit 301 conducts CNN training using an image difference value and a score error.

In step S1805, the image refiner unit 301 determines whether the number of training iterations has exceeded the maximum number of training iterations. In step S1805, when the number of training iterations is determined not to have exceeded the maximum number of training iterations (No in step S1805), the process returns to step S1802 and the generation of a refine image is continued.

On the other hand, in step S1805, when the number of training iterations is determined to have exceeded the maximum number of training iterations (Yes in step S1805), the process proceeds to step S1806. At this time, refine images (including a score-maximized refine image) generated by training iterations are stored in the refine image storing unit 305.

In step S1806, the important feature map generating unit 1311 acquires inferring unit structural information at the time of making inference with the score-maximized refine image as an input from the inferring unit 303 and generates an important feature map based on the acquired inferring unit structural information.

In step S1807, the degradation scale map generating unit 1312 generates a degradation scale map based on the incorrect inference image and the score-maximized refine image.

In step S1808, the superimposing unit 1313 generates an important feature index map based on the important feature map and the degradation scale map.

In step S1809, the superpixel segmenting unit 1321 segments the incorrect inference image into superpixels and generates superpixel segmentation information.

In step S1810, the important superpixel determining unit 1322 adds up a value of each pixel in the important feature index map on a superpixel-to-superpixel basis.

In step S1811, the important superpixel determining unit 1322 extracts superpixels whose added values are more than or equal to the important feature index threshold, and combines the superpixels selected from the extracted superpixels to define a changeable region. The important superpixel determining unit 1322 defines the superpixels other than the combined superpixels as an unchangeable region.

Subsequently, in step S1901 in FIG. 19, the important superpixel determining unit 1322 reads a refine image from the refine image storing unit 305.

In step S1902, the important superpixel determining unit 1322 extracts an image portion corresponding to the changeable region from the refine image.

In step S1903, the important superpixel determining unit 1322 extracts an image portion corresponding to the unchangeable region from the incorrect inference image.

In step S1904, the important superpixel determining unit 1322 synthesizes the image portion corresponding to the changeable region, which has been extracted from the refine image, and the image portion corresponding to the unchangeable region, which has been extracted from the incorrect inference image, to generate a synthesis image.

In step S1905, the inferring unit 303 makes inference with the synthesis image as an input to calculate the correct label score. The important superpixel evaluating unit 1323 acquires the correct label scores calculated by the inferring unit 303.

In step S1907, the image refiner unit 301 determines whether all the refine images stored in the refine image storing unit 305 have been read. When it is determined in step S1907 that there is a refine image that has not been read yet (No in step S1907), the process returns to step S1901.

On the other hand, when it is determined in step S1907 that all the refine images have been read (YES in step S1907), the process proceeds to step S1908.

In step S1908, the important superpixel determining unit 1322 determines whether the important feature index threshold has reached the lower limit value. In step S1908, when the important superpixel determining unit 1322 determines that the important feature index threshold has not reached the lower limit value yet (No in step S1908), the process proceeds to step S1909.

In step S1909, the important superpixel determining unit 1322 lowers the important feature index threshold, and the process returns to step S1811 in FIG. 18.

On the other hand, in step S1908, when the important superpixel determining unit 1322 determines that the important feature index threshold has reached the lower limit value (Yes in step S1908), the process proceeds to step S1910.

In step S1910, the important superpixel evaluating unit 1323 specifies a combination of superpixels (changeable region) that causes incorrect inference based on the acquired correct label score and outputs the specified combination as the incorrect inference cause information.

Specific Example of Incorrect Inference Cause Extracting Process

Figure 20:
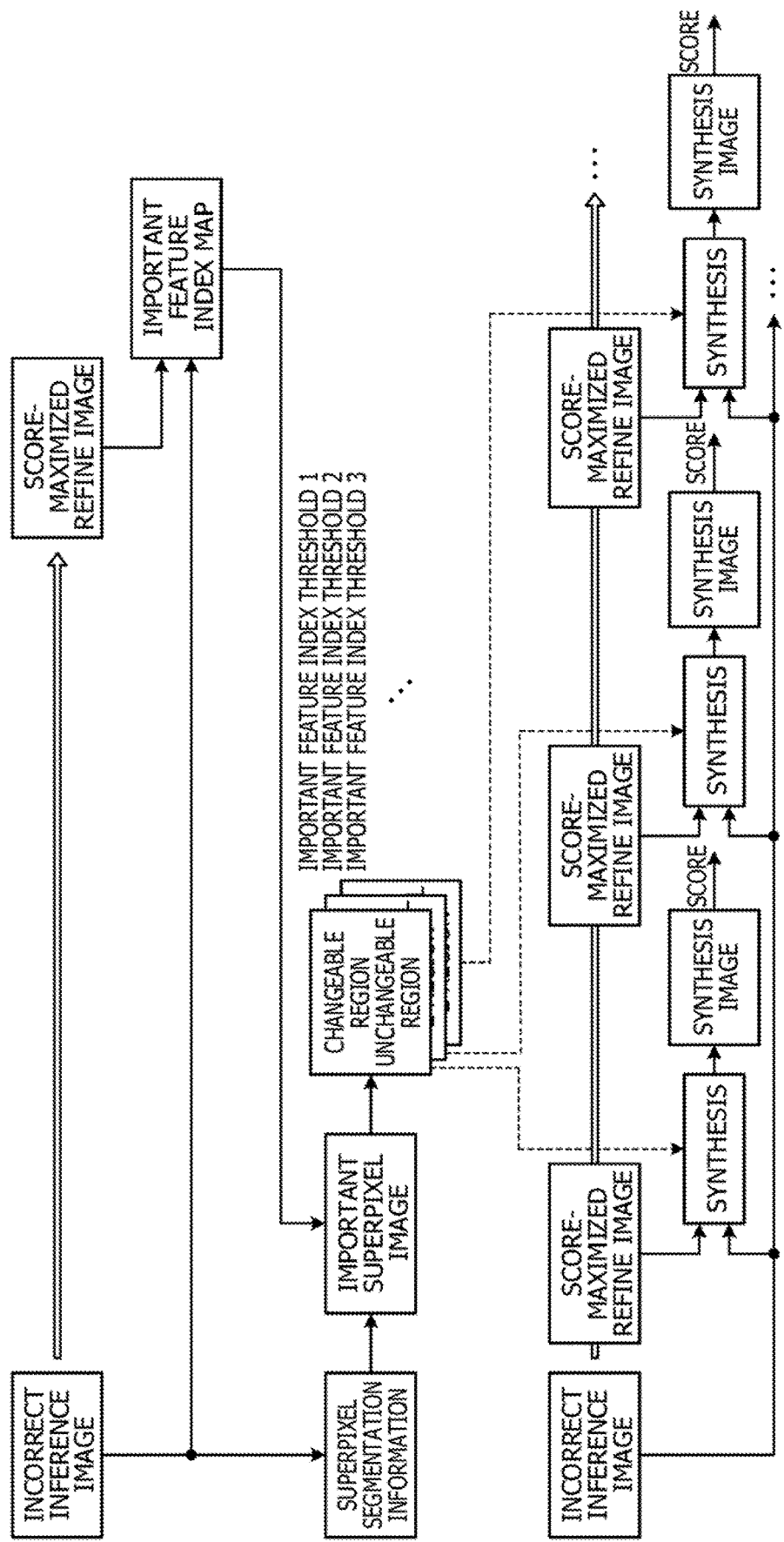
FIG. 20 is a first diagram illustrating a specific example of the incorrect inference cause extracting process.

Next, a specific example of the incorrect inference cause extracting process is described. FIG. 20 is a first diagram illustrating a specific example of the incorrect inference cause extracting process.

As illustrated in FIG. 20, first, when the refine image generating unit 1010 generates a score-maximized refine image from an incorrect inference image, the map generating unit 1310 generates an important feature index map.

Subsequently, when the superpixel segmenting unit 1321 generates superpixel segmentation information based on the incorrect inference image, the important superpixel determining unit 1322 generates an important superpixel image.

Subsequently, the important superpixel determining unit 1322 defines changeable regions and unchangeable regions based on the important superpixel image. At this time, the important superpixel determining unit 1322 changes the important feature index threshold and changes a combination selected from superpixels that exceed the important feature index threshold, to generates a plurality of sets of changeable regions and unchangeable regions. The important superpixel determining unit 1322 generates synthesis images using the plurality of sets of changeable regions and unchangeable regions thus generated (the example of FIG. 20 illustrates the case of generating synthesis images utilizing the score-maximized refine images).

Subsequently, the important superpixel evaluating unit 1323 acquires a correct label score inferred by the inferring unit 303 using each of the generated synthesis images as an input. In this way, the important superpixel evaluating unit 1323 specifies a combination of superpixels (changeable region) that causes incorrect inference based on the acquired correct label scores and outputs the specified combination as the incorrect inference cause information.

When synthesis images are generated utilizing a plurality of refine images generated by the refine image generating unit 1010, it is considered to use generation methods such as •a method of generating a synthesis image utilizing the last refine image, •a method of generating a synthesis image utilizing a refine image that produces the best correct label score (score-maximized refine image) among those inferred using the respective refine images as inputs, and •a method of generating a synthesis image utilizing a refine image that produces the best correct label score among those inferred using, as inputs, synthesis images generated utilizing the respective refine images.

As is clear from the above description, the analysis apparatus 100 according to the fourth embodiment generates the score-maximized refine image while changing the incorrect inference image such that the correct label score of inference is maximized. The analysis apparatus 100 according to the fourth embodiment acquires a degradation scale map and an important feature map generated based on the inferring unit structural information at the time of generating the score-maximized refine image, and superimposes these maps to generate an important feature index map. The analysis apparatus 100 according to the fourth embodiment generates superpixels by segmenting an incorrect inference image and adds up each pixel value in an important feature index map on a superpixel-to-superpixel basis. The analysis apparatus 100 according to the fourth embodiment extracts superpixels whose added values are more than or equal to the important feature index threshold, and defines the changeable region and the unchangeable region based on the combination of the superpixels selected from the extracted superpixels to define a changeable region. The analysis apparatus 100 according to the fourth embodiment makes inference by inputting, to the inferring unit, the incorrect inference image in which the defined changeable region (the region that affects the correct label inference) is replaced with the refine image. The analysis apparatus 100 according to the fourth embodiment makes inference while changing the important feature index threshold and the combination of superpixels selected, and specifies a combination of superpixel (changeable region) that causes incorrect inference from each inferred correct label score.

In this way, by replacing superpixels that affect correct label inference with a refine image and narrowing the superpixels while referring to the effect of replacement, it is possible to specify the image section that causes incorrect inference with high precision. In other words, for example, according to the fourth embodiment, it is possible to improve the precision at the time of specifying an image section that causes incorrect inference.

Fifth Embodiment

In the above-described fourth embodiment, the important feature index map is generated based on the inferring unit structural information at the time of generating the score-maximized refine image. In contrast, in a fifth embodiment, an average important feature index map is generated based on important feature index maps acquired during training conducted until a score-maximized refine image is generated. An important superpixel determining unit 1322 extracts superpixels more than or equal to an important feature index threshold based on the average important feature index map. Hereinafter, the fifth embodiment is described by focusing on a difference from the above-described fourth embodiment.

<Functional Configuration of Incorrect Inference Cause Extracting Unit>

Figure 21:
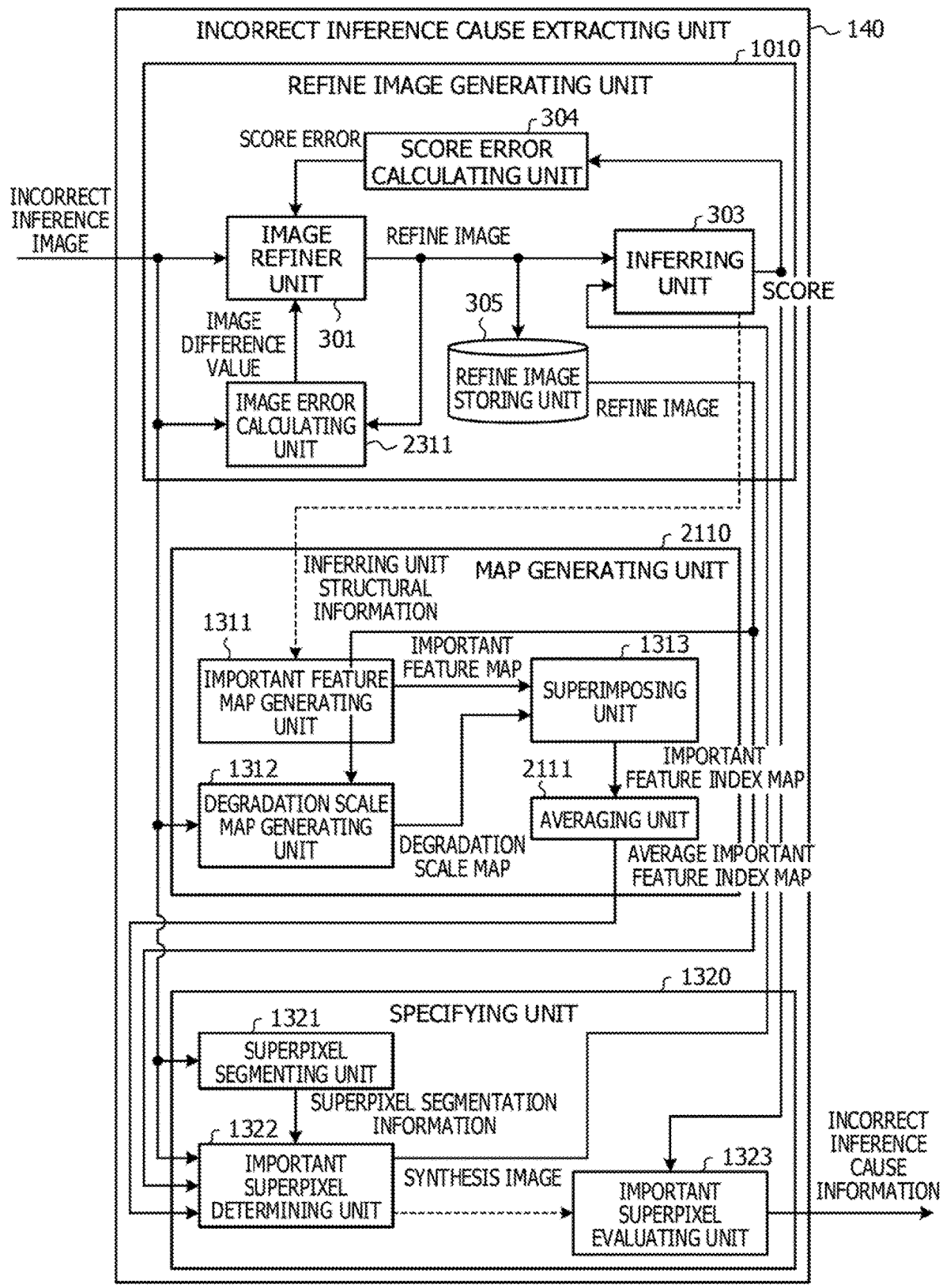
FIG. 21 is a fourth diagram illustrating an example of the functional configuration of the incorrect inference cause extracting unit.

First, the functional configuration of an incorrect inference cause extracting unit in an analysis apparatus according to the fifth embodiment is described. FIG. 21 is a fourth diagram illustrating an example of the functional configuration of the incorrect inference cause extracting unit. The difference from the functional configuration of the incorrect inference cause extracting unit illustrated in FIG. 13 is a map generating unit 2110. Hereinafter, the detail of the map generating unit 2110 is described.

As illustrated in FIG. 21, the map generating unit 2110 includes an averaging unit 2111 in addition to the important feature map generating unit 1311, the degradation scale map generating unit 1312, and the superimposing unit 1313.

The map generating unit 2110 consecutively acquires a refine image generated during training of the image refiner unit 301 and inferring unit structural information at the time when the inferring unit 303 makes inference with the refine image as an input. Every time acquiring a refine image and inferring unit structural information, in the map generating unit 2110, the important feature map generating unit 1311, the degradation scale map generating unit 1312, and the superimposing unit 1313 operate to generate an important feature index map.

The averaging unit 2111 calculates an average value of a plurality of important feature index maps generated by the superimposing unit 1313 every time the important feature map generating unit 1311 and the degradation scale map generating unit 1312 acquire a refine image and inferring unit structural information, to generate an average important feature index map.

<Specific. Example of Incorrect Inference Cause Extracting Process>

Figure 22:
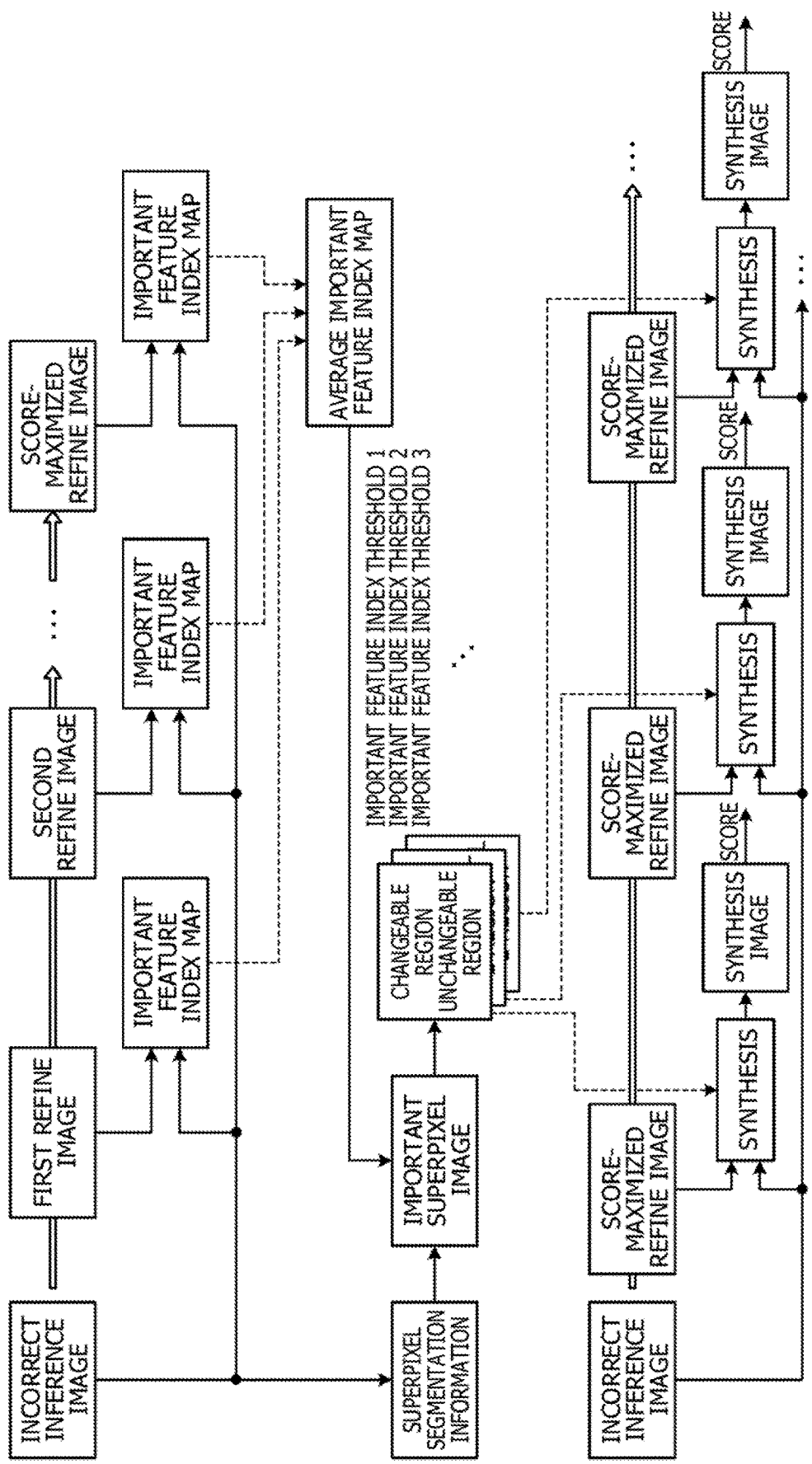
FIG. 22 is a second diagram illustrating a specific example of e incorrect inference cause extracting process.

Next, a specific example of the incorrect inference cause extracting process is described. FIG. 22 is a second diagram illustrating the specific example of the incorrect inference cause extracting process.

As illustrated in FIG. 22, in the refine image generating unit 1010, when the image refiner unit 301 generates a refine image from an incorrect inference image based on the first training result, the map generating unit 1310 generates an important feature index map.

In the refine image generating unit 1010, when the image refiner unit 301 generates a refine image from an incorrect inference image based on the second training result, the map generating unit 1310 generates an important feature index map. Thereafter, the same process is repeated, and when the refine image generating unit 1010 generates a score-maximized refine image, the map generating unit 1310 generates an important feature index map.

Subsequently, the averaging unit 2111 acquires a plurality of important feature index maps generated during a period from when the first refine image is generated to when the score-maximized refine image is generated. The averaging unit 2111 calculates an average value of the plurality of important feature index maps thus acquired to generate an average important feature index map.

Subsequently, the superpixel segmenting unit 1321 generates superpixel segmentation information based on the incorrect inference image and the important superpixel determining unit 1322 generates an important superpixel image.

Subsequently, the important superpixel determining unit 1322 defines changeable regions and unchangeable regions based on the important superpixel image. At this time, the important superpixel determining unit 1322 changes the important feature index threshold and changes a combination selected from superpixels that exceed the important feature index threshold, to generates a plurality of sets of changeable regions and unchangeable regions. The important superpixel determining unit 1322 generates synthesis images using the plurality of sets of changeable regions and unchangeable regions thus generated (the example of FIG. 22 illustrates the case of generating synthesis images utilizing the score-maximized refine images).

Subsequently, the important superpixel evaluating unit 1323 acquires a correct label score inferred by the inferring unit 303 using each of the generated synthesis images as an input. In this way, the important superpixel evaluating unit 1323 specifies a combination of superpixels (changeable region) that causes incorrect inference based on the acquired correct label and outputs the specified combination as the incorrect inference cause information.

In the above-described incorrect inference cause extracting process, the interval at which a refine image is acquired and an important feature index map is generated may be any desired interval. The important feature index map may be generated at every training or the important feature index map may be generated every time after a plurality of training iterations. Regarding acquiring the refine image and generating the important feature index map, a configuration may be employed that evaluates the correct label score of the inferring unit 303, and acquires a refine image and an important feature index map when the correct label score is larger than a predetermined threshold.

When synthesis images are generated utilizing a plurality of refine images generated by the refine image generating unit 1010, it is considered to use generation methods such as •a method of generating a synthesis image utilizing the last refine image, •a method of generating a synthesis image utilizing a refine image that produces the best correct label score (score-maximized refine image) among those inferred using the respective refine images as inputs, and •a method of generating a synthesis image utilizing a refine image that produces the best correct label score among those inferred using, as inputs, synthesis images generated utilizing the respective refine images.

As is clear from the above description, the analysis apparatus 100 according to the fifth embodiment generates an average important feature index map based on important feature index maps generated during training conducted until a score-maximized refine image is generated. The analysis apparatus 100 according to the fifth embodiment extracts superpixels more than or equal to the important feature index threshold based on the average important feature index map.

According to the fifth embodiment, this makes it possible to further reduce the influence on the important feature index map caused by fluctuation of refine images in addition to the effect by the above-described fourth embodiment.

Sixth Embodiment

In the above-described fourth embodiment, description is made in which when a score-maximized refine image is generated and an important feature index map is generated, the specifying unit 1320 starts the process of defining a changeable region and an unchangeable region and specifying an image section that causes incorrect inference.

In the above-described fifth embodiment, description is made in which when a score-maximized refine image is generated and an average important feature index map is generated, the specifying unit 1320 starts the process of defining a changeable region and an unchangeable region and specifying an image section that causes incorrect inference.

In contrast, in a sixth embodiment, after the specifying unit 1320 defines a changeable region and an unchangeable region, the refine image generating unit evaluates the defined changeable region and regenerates a score-maximized refine image again.

In this way, by evaluating a changeable region and regenerating a score-maximized refine image again, according to the sixth embodiment, it is possible to generate an important feature index map (or an average important feature index map) in which a feature portion that affects a correct label inference is more clarified. As a result, it becomes possible to increase the score at the time of inferring a label with a synthesis image as an input.

Hereinafter, the sixth embodiment is described by focusing on a difference from the above-described fourth or fifth embodiment.

<Functional Configuration of Incorrect Inference Cause Extracting Unit>

Figure 23:
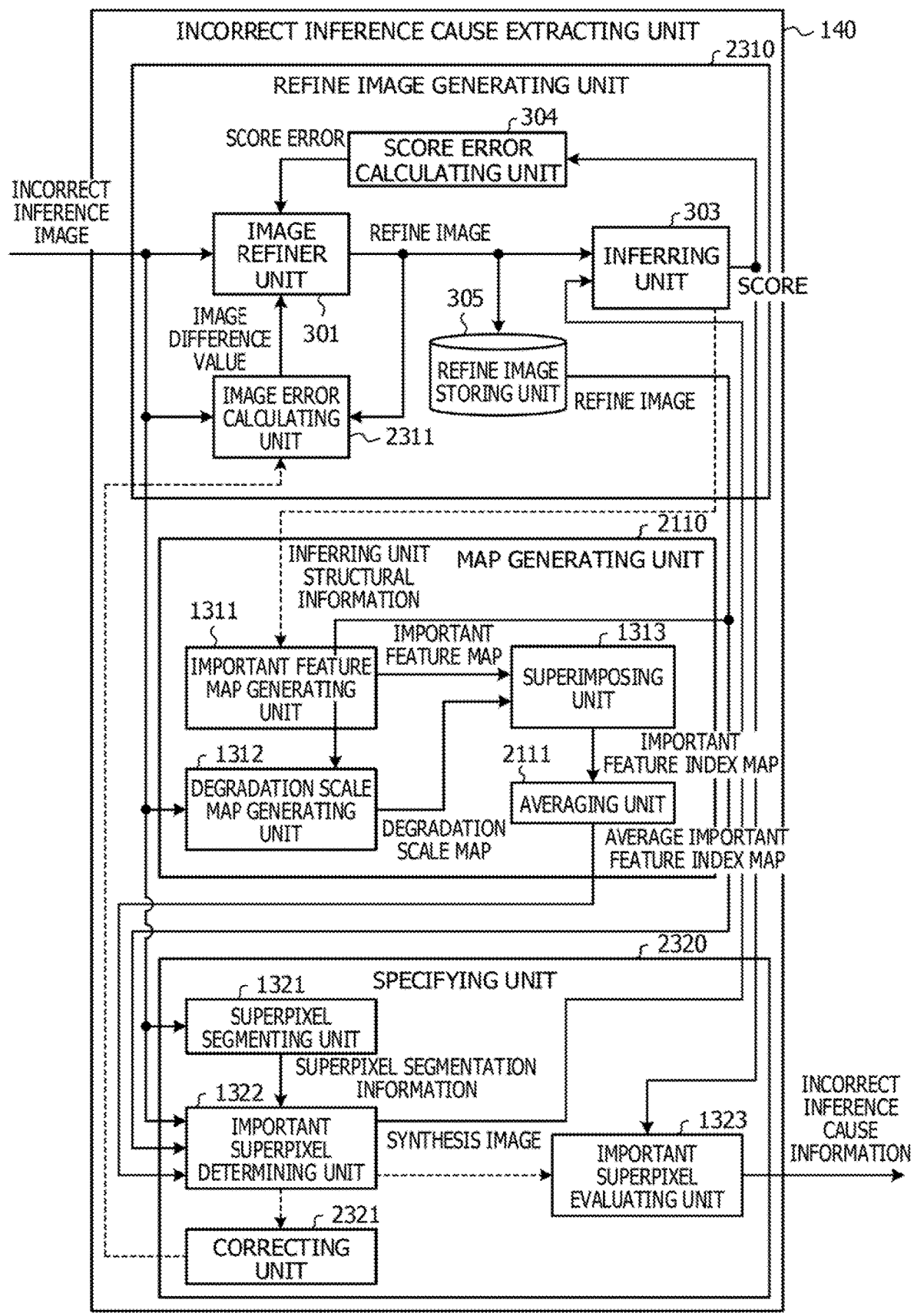
FIG. 23 is a fifth diagram illustrating an example of the functional configuration of the incorrect inference cause extracting unit.

First, the functional configuration of an incorrect inference cause extracting unit in an analysis apparatus according to the sixth embodiment is described. FIG. 23 is a fifth diagram illustrating an example of the functional configuration of the incorrect inference cause extracting unit. The differences from the functional configuration of the incorrect inference cause extracting unit illustrated in FIG. 21 are a refine image generating unit 2310 and a specifying unit 2320. First, the detail of the refine image generating unit 2310 and the specifying unit 2320 is described.

(1) Detail of Refine Image Generating Unit

First, the detail of the refine image generating unit 2310 is described. As illustrated in FIG. 23, the refine image generating unit 2310 includes an image error calculating unit 2311 having a different function from that of the image error calculating unit 302 of the refine image generating unit 1010.

The image error calculating unit 2311, like the image error calculating unit 302, calculates a difference between an incorrect inference image inputted to the image refiner unit 301 during training and a refine image outputted from the image refiner unit 301 during the training and inputs the image difference value to the image refiner unit 301. In the case of the image error calculating unit 2311, however, when inputting the image difference value to the image refiner unit 301, the image error calculating unit 2311 corrects the image difference value for an image portion corresponding to a changeable region given by a correcting unit 2321.

Specifically, for example, the image error calculating unit 2311 corrects the image difference value of the image portion corresponding to the changeable region by multiplying the image difference value by a coefficient less than 1. This allows the image refiner unit 301 to regenerate a score-maximized refine image after retraining with the image difference value of the image portion corresponding to the changeable region being made weaker than an image difference value of an image portion corresponding to a region other than the changeable region.

(2) Detail of Specifying Unit

Next, the detail of the specifying unit 2320 is described. As illustrated in FIG. 23, the specifying unit 2320 includes a correcting unit 2321 in addition to the superpixel segmenting unit 1321, the important superpixel determining unit 1322, and the important superpixel evaluating unit 1323.

The correcting unit 2321 acquires a changeable region defined by the important superpixel determining unit 1322 and notifies the image error calculating unit 2311 of the changeable region. This allows the refine image generating unit 2310 to relearn while evaluating the changeable region to regenerate a score-maximized refine image.

Specific Example of Incorrect Inference Cause Extracting Process

Figure 24:
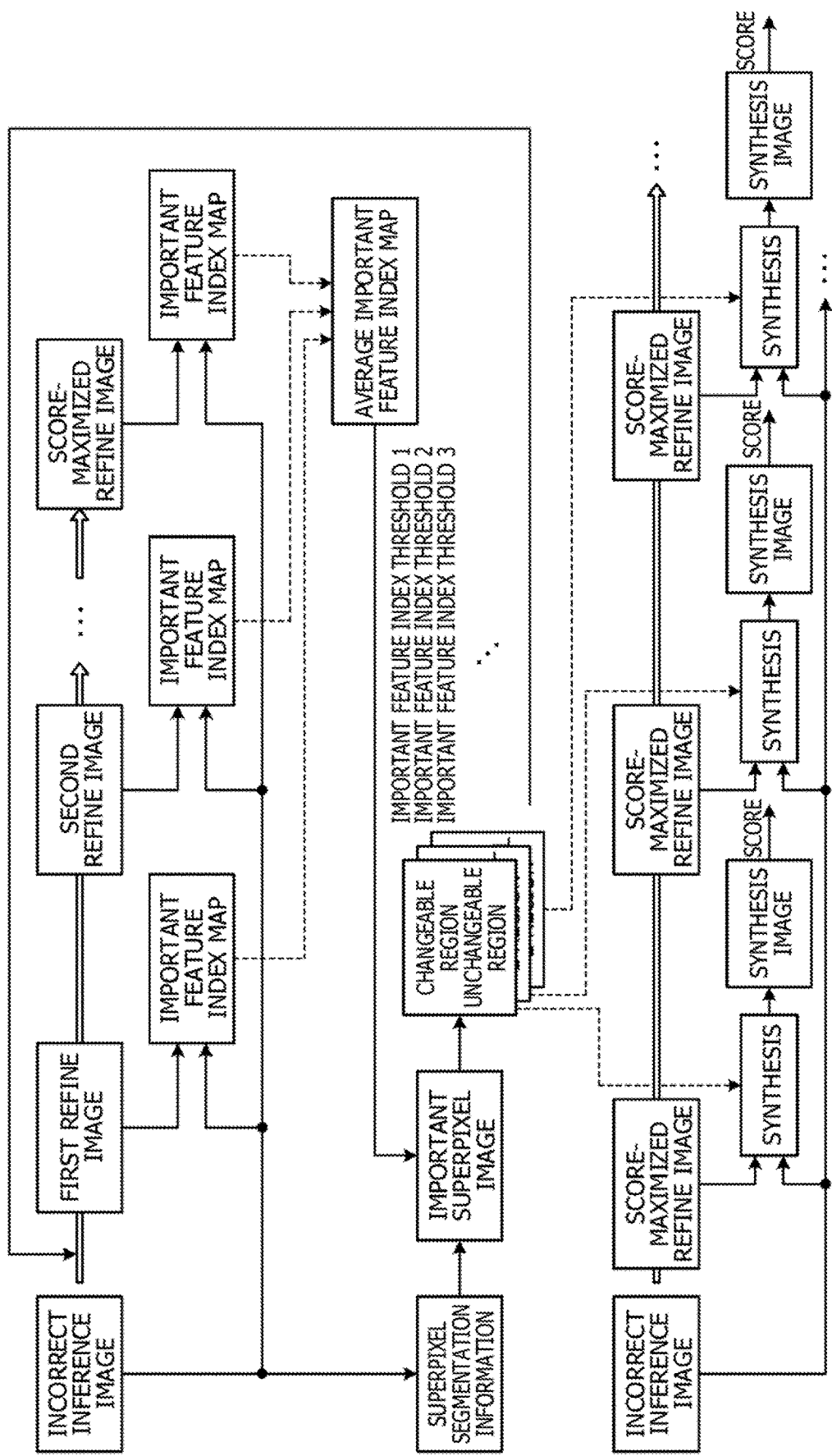
FIG. 24 is a third diagram illustrating a specific example of the incorrect inference cause extracting process.

Next, a specific example of the incorrect inference cause extracting process is described. FIG. 24 is a third diagram illustrating the specific example of the incorrect inference cause extracting process. The difference from the specific example of the incorrect inference cause extracting process described using FIG. 22 is that when a set of a changeable region and an unchangeable region is generated based on an important superpixel image, the correcting unit 2321 notifies the image error calculating unit 2311 of the changeable region. This allows the refine image generating unit 2310 to relearn while evaluating the changeable region to regenerate a score-maximized refine image and allows the map generating unit 2110 to regenerate an average important feature index map.

In the above-described incorrect inference cause extracting process, the interval at which a refine image is acquired and an important feature index map is generated may be any desired interval. The important feature index map may be generated at every training or the important feature index map may be generated every time after a plurality of training iterations. Regarding acquiring the refine image and generating the important feature index map, a configuration may be employed that evaluates the correct label score of the inferring unit 303, and acquires a refine image and an important feature index map when the correct label score is larger than a predetermined threshold.

When synthesis images are generated utilizing a plurality of refine images generated by the refine image generating unit 2310, it is considered to use generation methods such as •a method of generating a synthesis image utilizing the last refine image, •a method of generating a synthesis image utilizing a refine image that produces the best correct label score (score-maximized refine image) among those inferred using the respective refine images as inputs, and •a method of generating a synthesis image utilizing a refine image that produces the best correct label score among those inferred using, as inputs, synthesis images generated utilizing the respective refine images.

As is clear from the above description, the analysis apparatus 100 according to the sixth embodiment relearns while evaluating the changeable region to regenerate a score-maximized refine image and regenerate an average important feature index map.

According to the sixth embodiment, this makes it possible to generate an important feature index map (or an average important feature index map) in which a feature portion that affects correct label inference is more clarified and makes it possible to increase the score at the time of making inference with a synthesis image as an input.

Seventh Embodiment

In the above-described fourth to sixth embodiments, description is made in which a combination of superpixels that causes incorrect inference (changeable region) is specified and outputted as incorrect inference cause information. However, the method for outputting incorrect inference cause information is not limited to this, and for example, an important portion in a changeable region may be visualized and outputted. Hereinafter, a seventh embodiment is described by focusing on a difference from the above-described fourth to sixth embodiments.

<Functional Configuration of Incorrect Inference Cause Extracting Unit>

Figure 25:
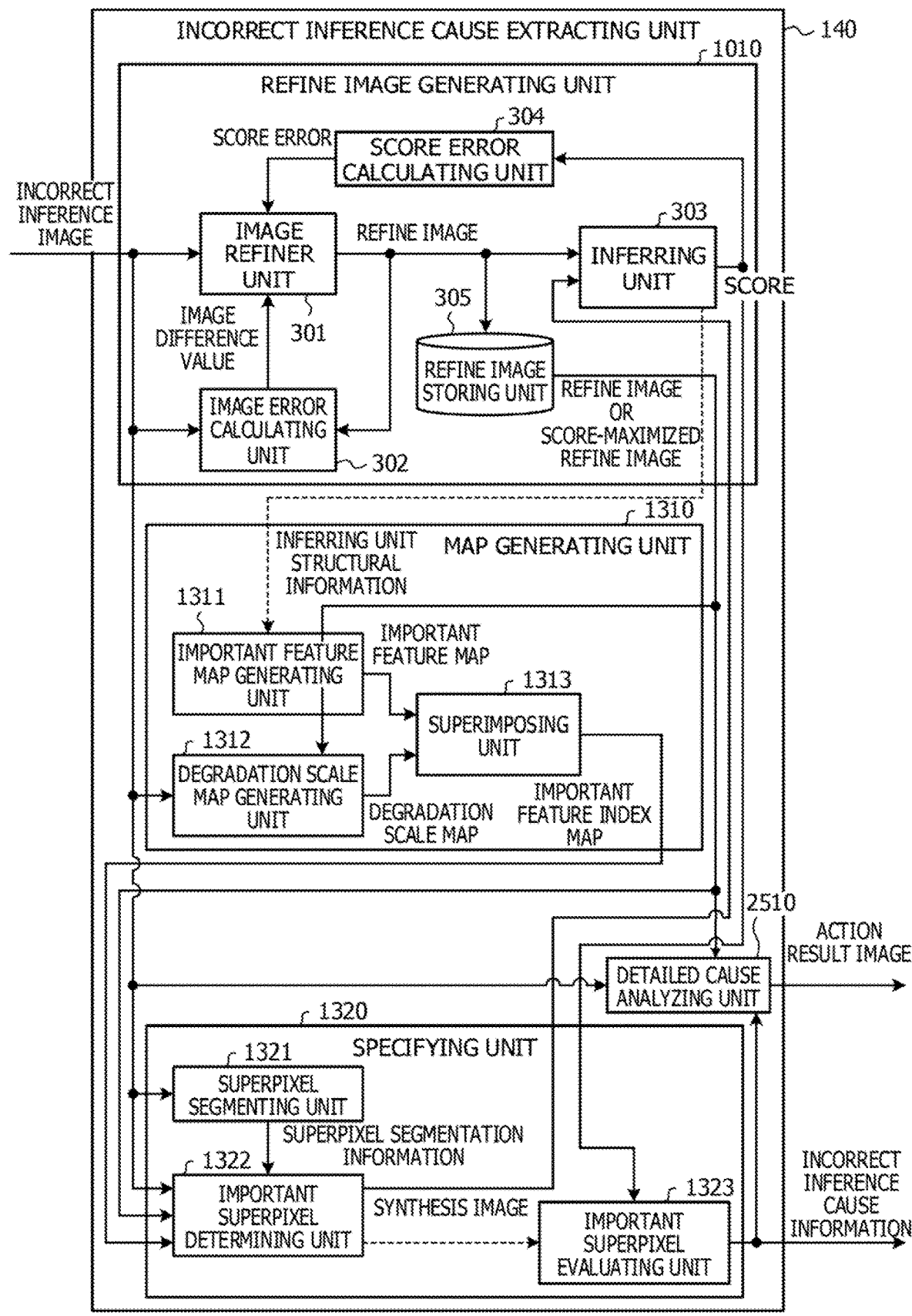
FIG. 25 is a sixth diagram illustrating an example of the functional configuration of the incorrect inference cause extracting unit.

First, the functional configuration of an incorrect inference cause extracting unit in an analysis apparatus 100 according to the seventh embodiment is described. FIG. 25 is a sixth diagram illustrating an example of the functional configuration of the incorrect inference cause extracting unit. The difference from the functional configuration of the incorrect inference cause extracting unit illustrated in FIG. 13 is that the incorrect inference cause extracting unit includes a detailed cause analyzing unit 2510.

The detailed cause analyzing unit 2510 visualizes an important portion in a changeable region using an incorrect inference image and a score-maximized refine image and outputs the visualized important portion as an action result image.

<Functional Configuration of Detailed Cause Analyzing Unit>

Figure 26:
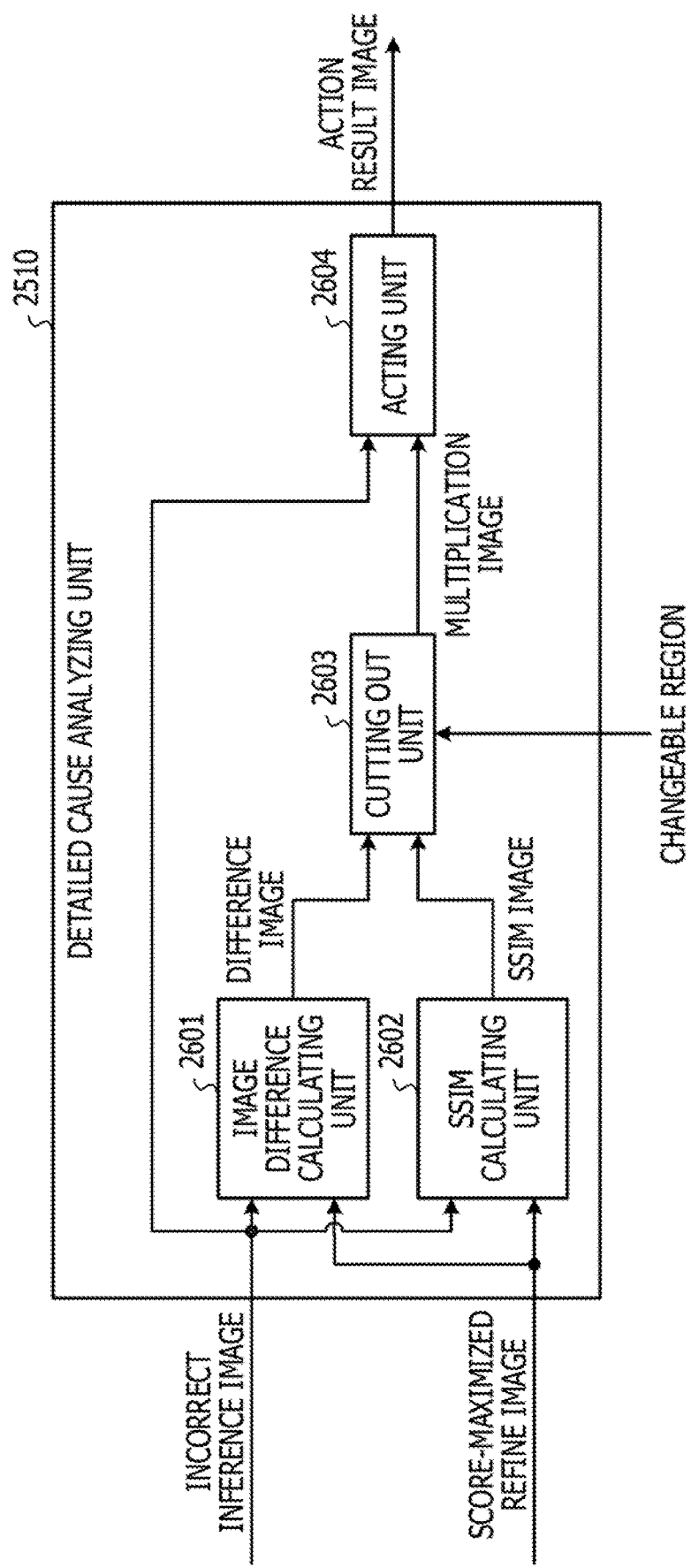
FIG. 26 is a first diagram illustrating an example of the functional configuration of the detailed cause analyzing unit.

Next, the functional configuration of the detailed cause analyzing unit 2510 is described, FIG. 26 is a first diagram illustrating an example of the functional configuration of the detailed cause analyzing unit. As illustrated in FIG. 26, the detailed cause analyzing unit 2510 includes an image difference calculating unit 2601, an SSIM calculating unit 2602, a cuffing out unit 2603, and an acting unit 2604.

The image difference calculating unit 2601 calculates a difference between an incorrect inference image and a score-maximized refine image on a pixel-to-pixel basis and outputs a difference image.

The SSIM calculating unit 2602 performs SSIM calculation using the incorrect inference image and the score-maximized refine image to output an SSIM image.

The cutting out unit 2603 cuts out an image portion corresponding to a changeable region from the difference image. The cutting out unit 2603 cuts out an image portion corresponding to a changeable region from the SSIM image. The cutting out unit 2603 multiplies the difference image and the SSIM image, from which the image portions corresponding to the changeable region have been cut out, to generate a multiplication image.

The acting unit 2604 generates an action result image based on the incorrect inference image and the multiplication image.

Specific Example of Process of Detailed Cause Analyzing Unit

Figure 27:
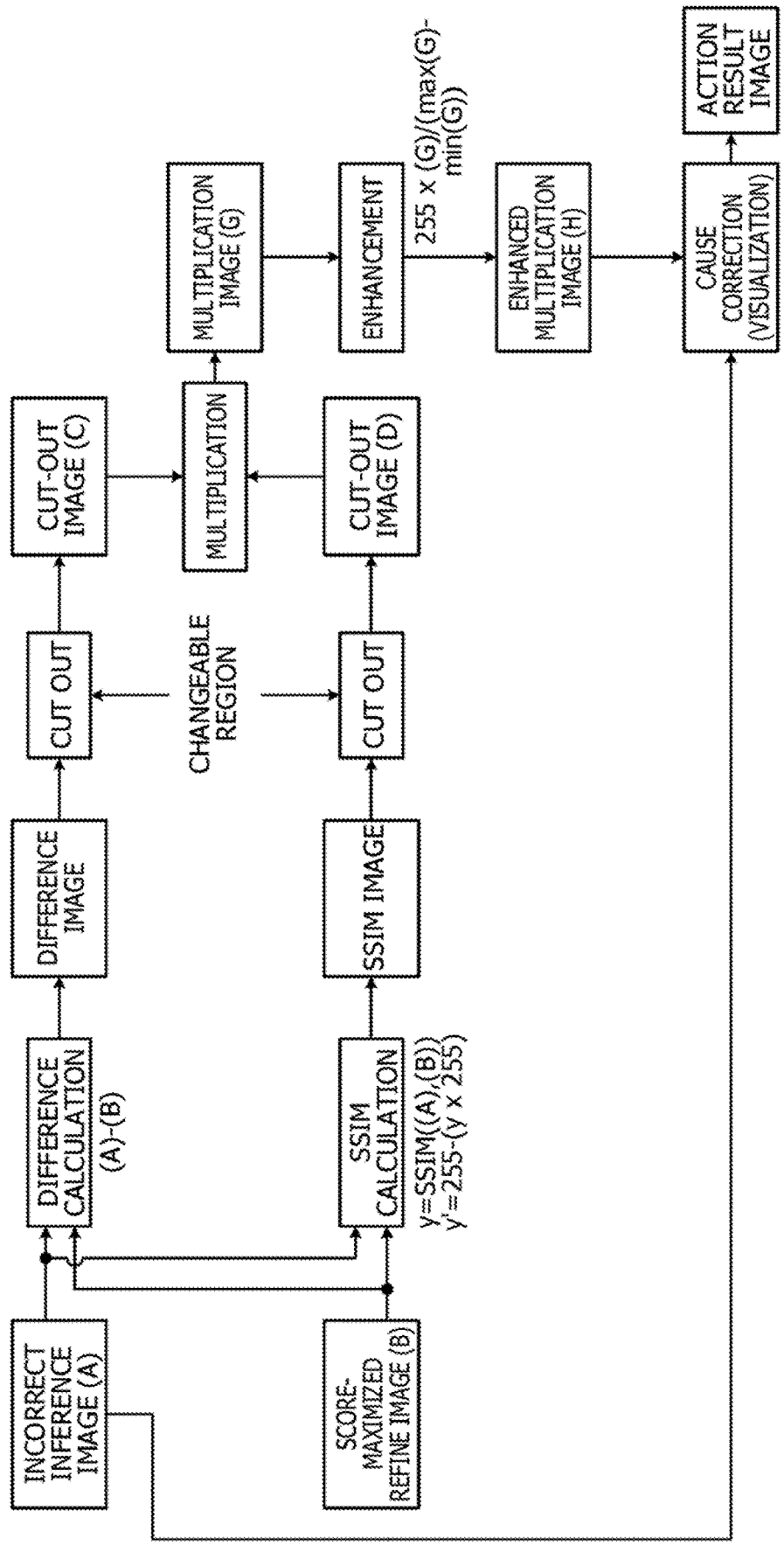
FIG. 27 is a first diagram illustrating a specific example of the process of the detailed cause analyzing unit.

Next, a specific example of the process of the detailed cause analyzing unit 2510 is described. FIG. 27 illustrates the specific example of the process of the detailed cause analyzing unit.

As illustrated in FIG. 27, first, the image difference calculating unit 2601 calculates a difference between the incorrect inference image (A) and the score-maximized refine image (B) (=(A)−(B)) and outputs a difference image. The difference image is pixel correction information in an image section that causes incorrect inference.

Subsequently, the SSIM calculating unit 2602 performs SSIM calculation based on the incorrect inference image (A) and the score-maximized refine image (B) (y=SSIM((A), (B)). The SSIM calculating unit 2602 outputs an SSIM image by inverting the result of the SSIM calculation (y'=255−(y×255)). The SSIM image is an image designating an image section that causes incorrect inference with high precision. A larger pixel value represents a larger difference and a smaller pixel value represents a smaller difference. The process of inverting the result of the SSIM calculation may be performed by calculating y'=1−y, for example.

Subsequently, the cutting out unit 2603 cuts out an image portion corresponding to a changeable region from the difference image to output a cut-out image (C). Similarly, the cutting out unit 2603 cuts out an image portion corresponding to a changeable region from the SSIM image to output a cut-out image (D).

The changeable region is a region obtained by narrowing an image portion that causes incorrect inference to a region, and the detailed cause analyzing unit 2510 is intended to perform cause analysis at a pixel-size level in the narrowed region.

For this reason, the cutting out unit 2603 multiplies the cut-out image (C) and the cut-out image (D) to generate a multiplication image (G). The multiplication image (G) is nothing other than pixel correction information obtained by designating the pixel correction information at an image section that causes incorrect inference with much higher precision.

The cutting out unit 2603 performs a enhancing process on the multiplication image (G) to output an enhanced multiplication image (H). The cutting out unit 2603 calculates the enhanced multiplication image (H) based on the following equation.

$$\text{Enhanced multiplication image }(H)= 255\times(G)/(\max(G)-\min(G)) \quad \text{(Equation 3)}$$

Subsequently, the acting unit 2604 subtracts the enhanced multiplication image (H) from the incorrect inference image (A) to visualize an important portion and generates an action result image.

The method for the enhancing process illustrated in FIG. 27 is only an example and the enhancing process may be performed by another method as long as the method makes it easier to distinguish an important portion after visualization, <Flow of Detailed Cause Analyzing Process>

Figure 28:
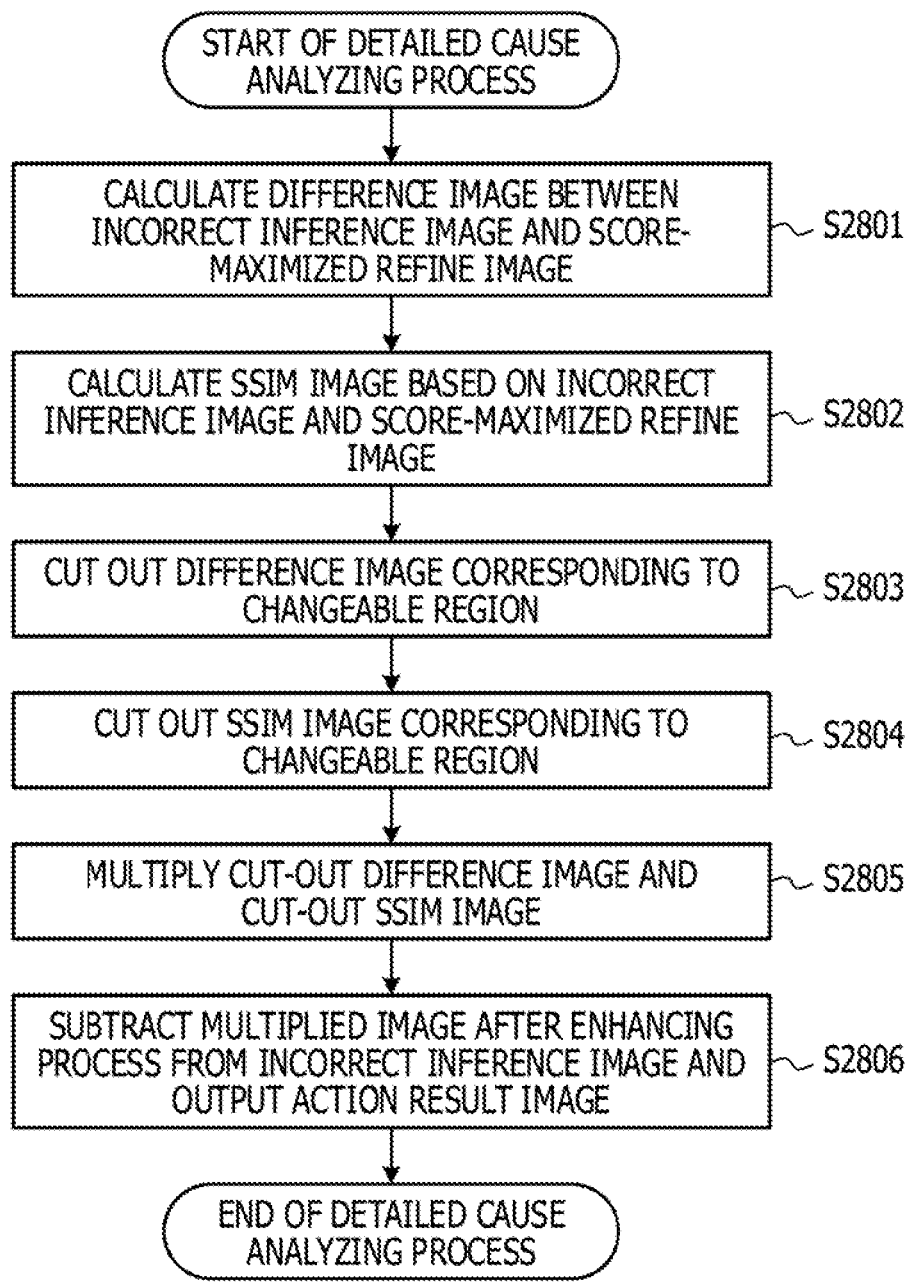
FIG. 28 is a first flowchart illustrating the flow of a detailed cause analyzing process.

Next, the flow of the detailed cause analyzing process performed by the detailed cause analyzing unit 2510 is described, FIG. 28 is a first flowchart illustrating the flow of the detailed cause analyzing process.

In step S2801, the image difference calculating unit 2601 calculates a difference image between an incorrect inference image and a score-maximized refine image.

In step S2802, the SSIM calculating unit 2602 calculates an SSIM image based on the incorrect inference image and the score-maximized refine image.

In step S2803, the cutting out unit 2603 cuts out a difference image corresponding to a changeable region.

In step S2804, the cutting out unit 2603 cuts out an SSIM image corresponding to the changeable region.

In step S2805, the cutting out unit 2603 multiplies the cut out difference image and the cut out SSIM image to generate a multiplication image.

In step S2806, the cutting out unit 2603 performs an enhancing process on the multiplication image. The acting unit 2604 subtracts the multiplication image subjected to the enhancing process from the incorrect inference image to output an action result image.

As is clear from the above description, the analysis apparatus 100 according to the seventh embodiment generates a difference image and an SSIM age based on an incorrect inference image and a score-maximized refine image, and cuts out and multiplies changeable regions of these. According to the analysis apparatus 100 according to the seventh embodiment, this makes it possible to visually check an image section that causes incorrect inference on a pixel-to-pixel basis in a changeable region.

Eighth Embodiment

In the above-described seventh embodiment, description is made in which an image section that causes incorrect inference is visualized on a pixel-to-pixel basis using a difference image and an SSIM image generated based on an incorrect inference image and a score-maximized refine image.

In contract, in an eighth embodiment, an image section that causes incorrect inference is visualized on a pixel-to-pixel basis further using an important feature map. Hereinafter, the eighth embodiment is described by focusing on a difference from the above-described seventh embodiment.

<Functional Configuration of Incorrect Inference Cause Extracting Unit>

Figure 29:
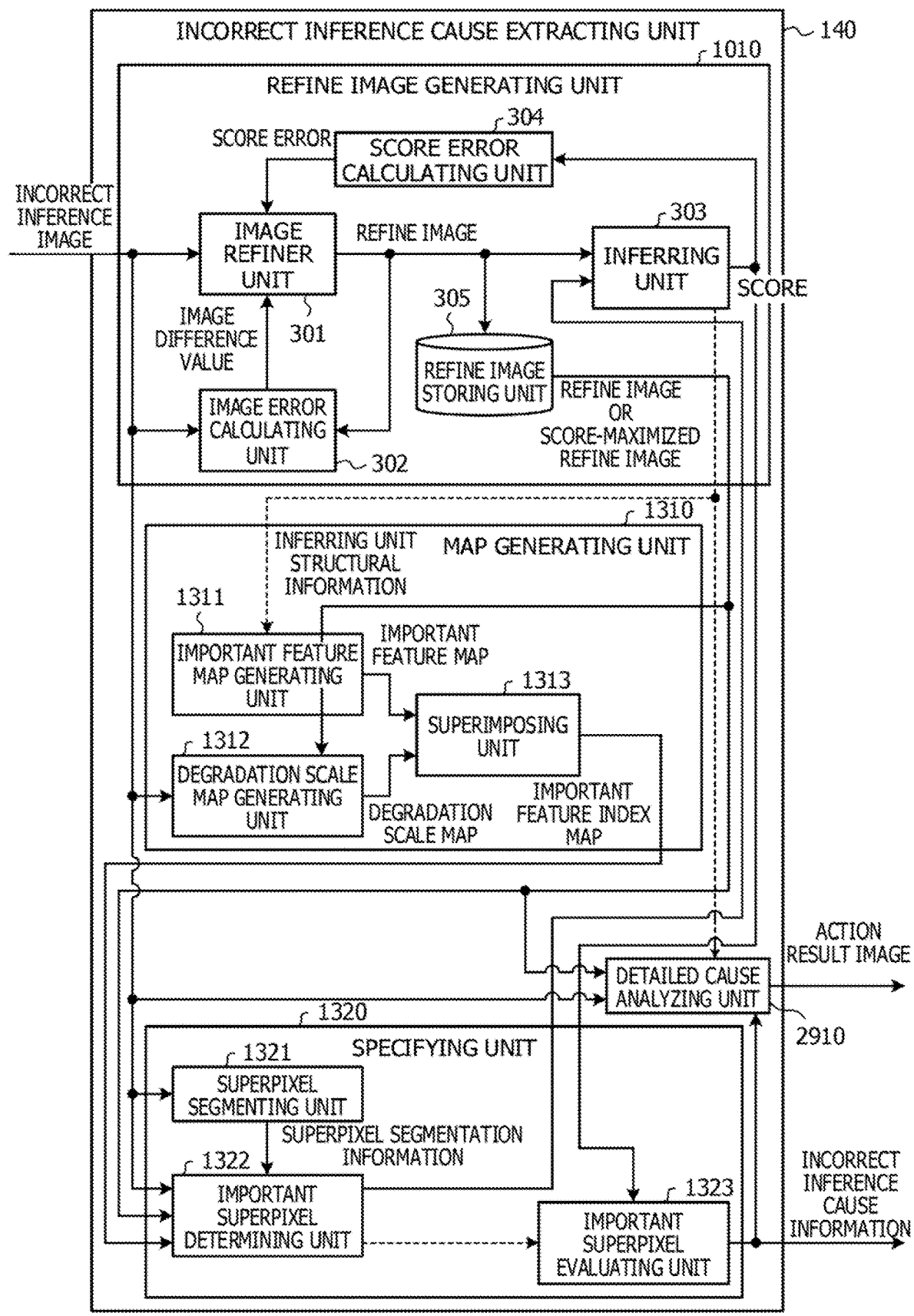
FIG. 29 is a seventh diagram illustrating an example of the functional configuration of the incorrect inference cause extracting unit.

First, the functional configuration of an incorrect inference cause extracting unit in an analysis apparatus 100 according to the eighth embodiment is described. FIG. 29 is a seventh diagram illustrating an example of the functional configuration of the incorrect inference cause extracting unit. The differences from the functional configuration of the incorrect inference cause extracting unit illustrated in FIG. 25 are that in the case of FIG. 29, the function of a detailed cause analyzing unit 2910 is different from the function of the detailed cause analyzing unit 2510 illustrated in FIG. 25 and the detailed cause analyzing unit 2910 acquires inferring unit structural information from the inferring unit 303.

The detailed cause analyzing unit 2910 visualizes an image section that causes incorrect inference on a pixel-to-pixel basis using a difference image, an SSIM image, and an important feature map, generated based on an incorrect inference image, a score-maximized refine image, and inferring unit structural information.

The difference image, the SSIM image, and the important feature map, used by the detailed cause analyzing unit 2910 to visualize an image section that causes incorrect inference on a pixel-to-pixel basis have the following attributes. —The difference image: difference information for each pixel and information having a positive or negative value indicating how much to correct the pixel in order to improve classification probability of a designated class. —The SSIM image: difference information considering states of change in the entire image and a local region and information having less artifacts (unintentional noise) than difference information for each pixel. In other words, for example, difference information with higher precision (note that it is information with a positive value only), —Important Feature Map: a map in which a feature portion that affects correct label inference is visualized.

<Functional Configuration of Detailed Cause Analyzing Unit>

Figure 30:
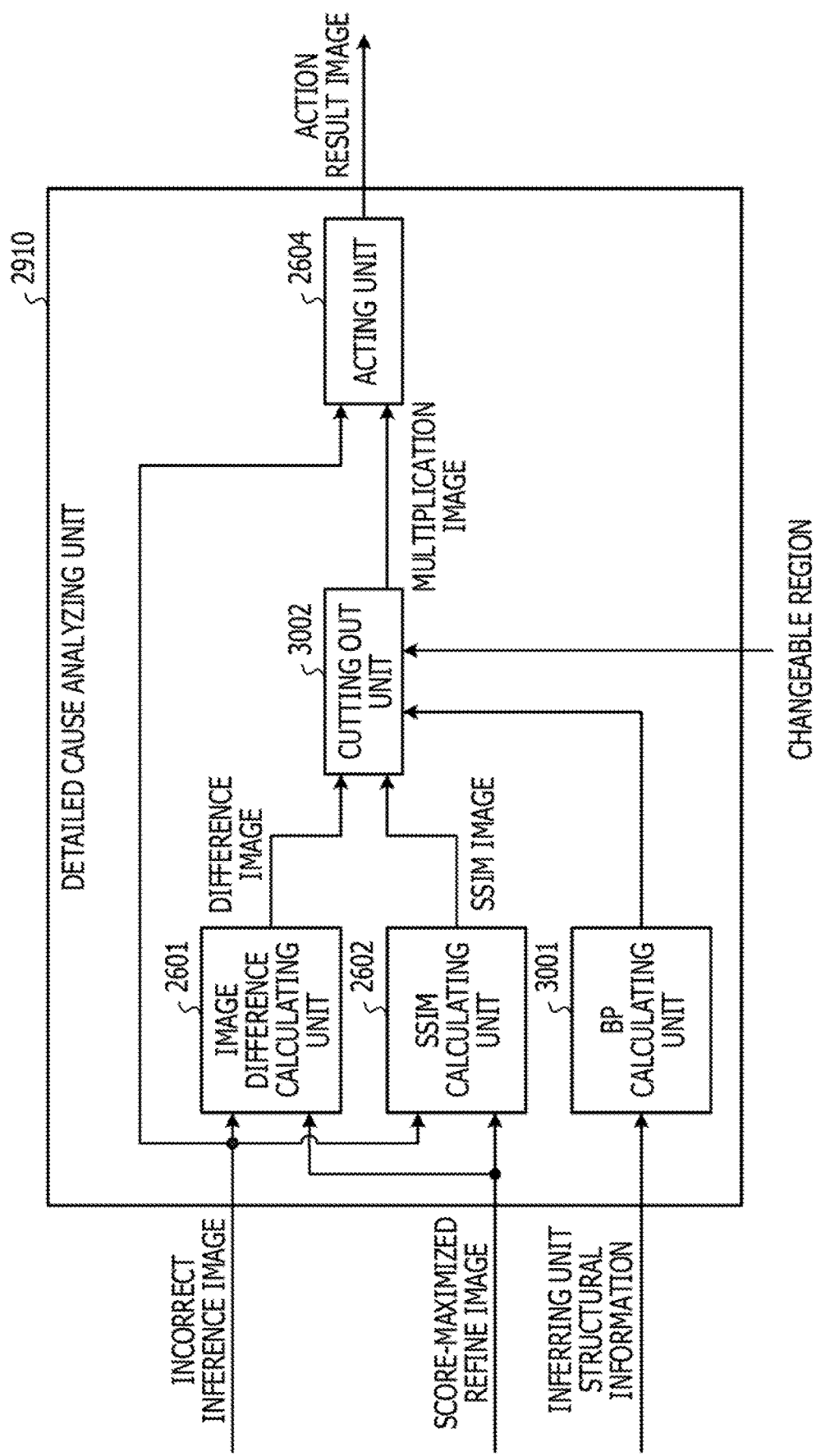
FIG. 30 is a second diagram illustrating an example of the functional configuration of the detailed cause analyzing unit.

Next, the functional configuration of the detailed cause analyzing unit 2910 is described. FIG. 30 is a second diagram illustrating an example of the functional configuration of the detailed cause analyzing unit. The differences from the functional configuration illustrated in FIG. 26 are that in the case of FIG. 30, the detailed cause analyzing unit includes a BP calculating unit 3001 and the function of a cutting out unit 3002 is different from the function of the cutting out unit 2603 illustrated in FIG. 26.

The BP calculating unit 3001 acquires, from the inferring unit 303, inferring unit structural information at the time of making inference with a score-maximized refine image as an input. The BP calculating unit 3001 generates an important feature map based on the inferring unit structural information using the BP method.

The cutting out unit 3002 cuts out an image portion corresponding to a changeable region from the important feature map in addition to cutting out image portions corresponding to the changeable region from the difference image and the SSIM image. The cutting out unit 3002 multiplies the difference image, the SSIM image, and the important feature map, from which the image portions corresponding to the changeable region have been cut out, to generate a multiplication image.

By multiplying the difference image, the SSIM image, and the important feature map, it is made possible to visually check an image section that causes incorrect inference on a pixel-to-pixel basis in an action result image.

Figure 31:
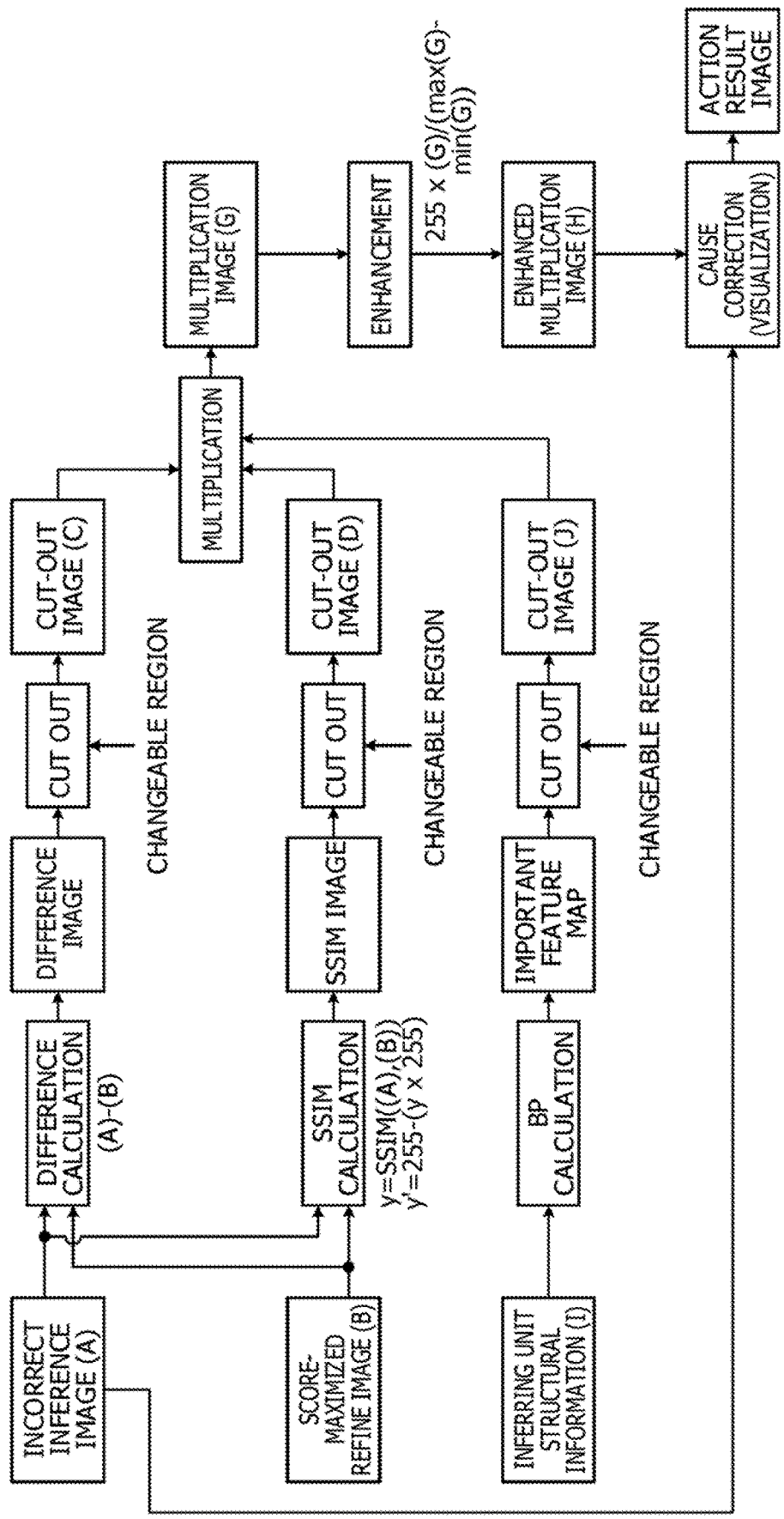
FIG. 31 is a second diagram illustrating a specific example of the process of the detailed cause analyzing unit.

By using the difference image in the multiplication, the action result image is automatically corrected to an image that increases a correct label score. Hence, when such advantage is not taken into consideration, the detailed cause analyzing unit 2910 may multiply the SSIM image and the important feature map (without using the difference image) to output an action result image, Specific Example of Process of Detailed Cause Analyzing Unit Next, a specific example of the process of the detailed cause analyzing unit 2910 is described. FIG. 31 is a second diagram illustrating the specific example of the process of the detailed cause analyzing unit. The difference from the specific example of the process of the detailed cause analyzing unit 2510 illustrated in FIG. 27 is that the BP calculating unit 3001 performs the process using the BP method based on inferring unit structural information (I) to generate an important feature map. The second difference is that the cutting out unit 3002 cuts out an image portion corresponding to a changeable region from the important feature map to output a cut-out image (J). The third difference is that the cutting out unit 3002 multiplies the cut-out image (C), the cut-out image (D), and the cut-out image (J) to generate a multiplication image (G).

<Flow of Detailed Cause Analyzing Process>

Next, the flow of the detailed cause analyzing process performed by the detailed cause analyzing unit 2910 is described. FIG. 32 is a second flowchart illustrating the flow of the detailed cause analyzing process. The differences from the flowchart illustrated in FIG. 28 are step S3201, step S3202, and step S3203.

In step S3201, the BP calculating unit 3001 acquires inferring unit structural information at the time of making inference with a score-maximized refine image as an input from the inferring unit 303 and generates an important feature map based on the acquired inferring unit structural information using the BP method.

In step S3202, the cutting out unit 3002 cuts out an image portion corresponding to the changeable region from the important feature map.

In Step S3203, the cutting out unit 3002 multiplies the difference image, the SSIM image, and the important feature map, from which the image portions corresponding to the changeable region have been cut out, to generate a multiplication image.

As is clear from the above description, the analysis apparatus 100 according to the eighth embodiment generates the difference image, the SSIM image, and the important feature map based on the incorrect inference image, the score-maximized refine image, and the inferring unit structural information, and cuts out and multiplies changeable regions of these. According to the analysis apparatus 100 according to the eighth embodiment, this makes it possible to visually check an image section that causes incorrect inference on a pixel-to-pixel basis in a changeable region.

The present disclosure is not limited to the configurations illustrated herein while the configurations exemplified according to the aforementioned embodiments may also be combined with other elements, for example. These aspects may be changed without departing from the gist of the present disclosure and appropriately set in accordance with applied modes thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention,

What is claimed is:

1. A non-transitory computer-readable storage medium for storing an analysis program which causes a processor to perform processing, the processing comprising:
    generating a first image by changing a second image such that a correct label score of inference is maximized, the second image being an input image to an image recognition process configure to output at least any of an incorrect label or a correct label in response to the second image; and
    narrowing, based on a score of a label, a predetermined region to specify an image section that causes incorrect inference, the score of the label being inferred by inputting to an inferring process an image obtained by replacing the predetermined region in the second image with the first image,
    a map indicating a degree of influence on inference of the label is generated from information on the inferring process at the time of inferring the label, and
    the narrowing of the predetermined region is configured to narrow the predetermined region to a size corresponding to the generated map.

2. The non-transitory computer-readable storage medium according to claim 1, wherein
    a map indicating degree of attention on each of image portions of the incorrect inference image to which the inferring unit pays attention at the time of making inference is generated from the information on the inferring unit using the Grad-CAM method, and
    the narrowing of the predetermined region is configured to narrow the predetermined region to an image portion having a degree of attention of a predetermined level or higher.

3. The non-transitory computer-readable storage medium according to claim 2, wherein the generating of the refine image is configured to generate the refine image by changing the predetermined region in the incorrect inference image such that the correct label score of inference is maximized.

4. The non-transitory computer-readable storage medium according to claim 2, wherein the generating of the refine image is configured to generate the refine image by changing the entire incorrect inference image such that the correct label score of inference is maximized.

5. The non-transitory computer-readable storage medium according to claim 3, wherein when a score of a label inferred by the inferring unit falls below an acceptable value as a result of narrowing the predetermined region by increasing the predetermined level, a region before the narrowing is specified as an image section that causes incorrect inference.

6. The non-transitory computer-readable storage medium according to claim 1, wherein
    a changed portion that has been changed from the incorrect inference image at the time of generating the refine image and a feature portion of the incorrect inference image calculated from the information on the inferring unit are superimposed to generate a map indicating important features of respective pixels of the incorrect inference image,
    the incorrect inference image is segmented into superpixels, and
    the narrowing of the predetermined region is configured to narrow the predetermined region to a superpixel whose added value is more than or equal to a predetermined threshold, the added value being obtained by adding pixel values of a map indicating important features of the respective pixels for each of the superpixels.

7. The non-transitory computer-readable storage medium according to claim 6, wherein
    the changed portion that has been changed from the incorrect inference image at the time of generating the refine image is calculated based on a difference between the incorrect inference image and the refine image, and
    a feature portion of the refine image which is used by the inferring unit to infer is calculated from information on the inferring unit, using a BP method or a GBP method.

8. The non-transitory computer-readable storage medium according to claim 6, wherein
    when the refine image is generated while changing the incorrect inference image such that the correct label score of inference is maximized, a map indicating important features of the respective pixels of the incorrect inference image is generated every time the refine image is generated, and
    for each superpixel, the added value is calculated by adding up an average value of the pixel values of each of the maps each indicating the important features of the respective pixels.

9. The non-transitory computer-readable storage medium according to claim 6, wherein after the predetermined region is narrowed, a refine image is generated again by changing the incorrect inference image such that the correct label score of inference is maximized, and the predetermined region is narrowed again to a superpixel whose added value is more than or equal to the predetermined threshold.

10. The non-transitory computer-readable storage medium according to claim 1, wherein
    a multiplication image is visualized in the incorrect inference image, the multiplication image being obtained by multiplying
    an image that is obtained by cutting out the predetermined region from a difference image calculated based on a difference between the incorrect inference image and the refine image and an image that is obtained by cutting out the predetermined region from an SSIM image obtained by performing SSIM calculation on the incorrect inference image and the refine image.

11. The non-transitory computer-readable storage medium according to claim 1, wherein
a multiplication image is visualized in the incorrect inference image, the multiplication image being obtained by multiplying
an image obtained by cutting out the predetermined region from a difference image calculated based on a difference between the incorrect inference image and the refine image,
an image obtained by cutting out the predetermined region from an SSIM image obtained by performing SSIM calculation on the incorrect inference image and the refine image, and
an image obtained by cutting out the predetermined region in a feature portion of the refine image which has been used by the inferring unit to infer from information on the inferring unit, using a BP method or a GBP method.

12. An analysis apparatus comprising:
a memory and
a processor coupled to the memory, the processor being configured to
execute a refine image generating processing that includes generating a first image by changing a second image such that a correct label score of inference is maximized, the second image being an input image to an image recognition process configure to output at least any of an incorrect label or a correct label in response to the second image; and
execute a specifying processing that includes narrowing, based on a score of a label, a predetermined region to specify an image section that causes incorrect inference, the score of the label being inferred by using an image obtained by replacing the predetermined region in the second image with the first image,
a map indicating a degree of influence on inference of the label is generated from information on the inferring process at the time of inferring the label, and
the narrowing of the predetermined region is configured to narrow the predetermined region to a size corresponding to the generated map.

13. An analysis method implemented by a computer, the analysis method comprising:
generating a first image by changing a second image such that a correct label score of inference is maximized, the second image being an input image to an image recognition process configure to output at least any of an incorrect label or a correct label in response to the second image; and
narrowing, based on a score of a label, a predetermined region to specify an image section that causes incorrect inference, the score of the label being inferred by inputting to an inferring process an image obtained by replacing the predetermined region in the second image with the first image,
a map indicating a degree of influence on inference of the label is generated from information on the inferring process at the time of inferring the label, and
the narrowing of the predetermined region is configured to narrow the predetermined region to a size corresponding to the generated map.

* * * * *